（12）United States Patent
Orihuel Iranzo et al.

(10) Patent No.: US 10,736,316 B2
(45) Date of Patent: Aug. 11, 2020

(54) SILICA PARTICLES FUNCTIONALIZED AND LOADED WITH FUNGICIDAL AGENTS, THEIR MANUFACTURE AND THEIR USE AS SYSTEMS OF TARGETED AND CONTROLLED RELEASE OF FUNGICIDES

(71) Applicant: PRODUCTOS CITROSOL, S.A., Potries (Valencia) (ES)

(72) Inventors: Benito Orihuel Iranzo, Potries (ES); Javier Parra Carbonell, Potries (ES)

(73) Assignee: PRODUCTOS CITROSOL, S.A., Porties (Valencia) (ES)

( * ) Notice: Subject to any disclaimer, the term of this patent is extended or adjusted under 35 U.S.C. 154(b) by 13 days.

(21) Appl. No.: 16/062,062

(22) PCT Filed: Dec. 15, 2015

(86) PCT No.: PCT/ES2015/070907
§ 371 (c)(1),
(2) Date: Jun. 13, 2018

(87) PCT Pub. No.: WO2017/103292
PCT Pub. Date: Jun. 22, 2017

(65) Prior Publication Data
US 2018/0368396 A1   Dec. 27, 2018

(51) Int. Cl.
| | | |
|---|---|---|
| *A01N 25/10* | (2006.01) | |
| *A01N 43/50* | (2006.01) | |
| *A01N 25/28* | (2006.01) | |
| *A01N 43/653* | (2006.01) | |
| *A01N 43/78* | (2006.01) | |
| *C07F 7/08* | (2006.01) | |

(52) U.S. Cl.
CPC ............ *A01N 25/10* (2013.01); *A01N 25/28* (2013.01); *A01N 43/50* (2013.01); *A01N 43/653* (2013.01); *A01N 43/78* (2013.01); *C07F 7/0874* (2013.01); *C07F 7/0878* (2013.01)

(58) Field of Classification Search
CPC ........ A01N 43/50; A01N 43/78; A01N 43/54; A01N 25/10; A01N 25/28; A01N 43/653; C07F 7/0874; C07F 7/0878

USPC ......................................................... 504/217
See application file for complete search history.

(56) References Cited

U.S. PATENT DOCUMENTS

| | | |
|---|---|---|
| 2007/0142410 A1 | 6/2007 | Garnier |
| 2011/0244056 A1 | 10/2011 | Santra |
| 2012/0074603 A1 | 3/2012 | Traynor et al. |
| 2012/0295790 A1 | 11/2012 | Yan et al. |

OTHER PUBLICATIONS

Kortesuo P et al. ,Oct. 2001,Journal of Controlled Release,vol. 76, No. 3,pp. 227-238.*
Harrison Wanyika, 2013, J. Nanopart Res, 15:1831, pp. 1-9.*
Jambhrunkar Siddharth et al, "Modulating in vitro release and solubility of griseofulvin using functionalized mesoporous silica nanoparticles", Journal of Colloid and Interface Science, Aug. 20, 2014 (Aug. 20, 2014), pp. 218-225, vol. 434, Academic Press, New York, NY, US, ISSN: 0021-9797, DOI: 10.1016/J.JCIS.2014.08.019.
Kortesuo Pirjo et al, "Alkyl-substituted silica gel as a carrier in the controlled release of dexmedetomidine", Journal of Controlled Release, Oct. 19, 2001 (Oct. 19, 2001), pp. 227-238, vol. 76, No. 3, Elsevier, Amsterdam, NL, ISSN: 0168-3659, DOI: 10.1016/S0168-3659(01)00428-X.

* cited by examiner

*Primary Examiner* — Johann R Richter
*Assistant Examiner* — Courtney A Brown
(74) *Attorney, Agent, or Firm* — Westman, Champlin & Koehler, P.A.

(57) ABSTRACT

The present invention relates to porous silica particles partially functionalized with long hydrocarbon chains loaded with a fungicidal agent having the ability to release the fungicidal agent in a targeted and selective manner at the site of infection, thus avoiding the unnecessary release of fungicidal agents on the plant product and into the environment. The invention also relates to a process for preparing these particles, to a system for the controlled and targeted release of fungicide based on the same and to the use thereof for fungicide treatments.

25 Claims, 19 Drawing Sheets

SILICA PARTICLES FUNCTIONALIZED AND LOADED WITH FUNGICIDAL AGENTS, THEIR MANUFACTURE AND THEIR USE AS SYSTEMS OF TARGETED AND CONTROLLED RELEASE OF FUNGICIDES

CROSS-REFERENCE TO RELATED APPLICATION(S)

The present application is a § 371 national phase entry of International patent application Serial No. PCT/ES2015/070907, filed Dec. 15, 2015.

FIELD OF THE INVENTION

The present invention pertains to the field of fungicide treatments for plant products. More particularly, the present invention relates to partially functionalized porous silica particles loaded with a fungicidal agent having the ability to release the fungicidal agent in a targeted and selective manner at the site of infection, thus avoiding the unnecessary release of fungicidal agents on the vegetable product and into the environment. The invention also relates to a process for preparing these particles as well as to a controlled and targeted release system of fungicide based on the use thereof. Finally, the invention relates to the general use of the silica particles of the invention, as well as more specifically to a method for avoiding the rotting of fruit and vegetable products caused by fungi without producing free fungicide residues in the water used for the treatment and washing and thus reducing the residues of fungicide to trace level.

BACKGROUND OF THE INVENTION

The losses due to rotting caused by fungal, and in some cases bacterial pathogens in plant tissues and, more particularly, in fruit and vegetable products, are an important problem on farms.

There are many ways by which fungal pathogens cross the external barriers of plant products and gain access to nutrient-rich tissues that allow them to cause infections. From among them, undoubtedly, the most common entryway is through wounds made both before harvest, and during harvest and during the processing and storage following the same (mechanical damage, damage caused by cold or heat, insect bites, etc.) although some fungi are capable of penetrating through natural openings (stomas, lenticels, peduncle, etc.) and some even without the need of a physical opening on the surface, by means of the direct attack thereof with enzymes and specialized organs which end up causing an opening on the surface (S. Bautista-Baños, 2014. *Postharvest Decay: Control Strategies*). In either case, one way or another, there is always an access opening on the surface of the plant product where the pathogen enters, allowing it to gain access to the nutrient-rich tissues under the epidemlis, and cause the infection. As a consequence, targeting any fungicide against said openings where the infection begins or may begin (sites of infection) could be enough to achieve efficacy against these pathologies.

Nowadays, however, fungicides are applied as an aqueous solution or emulsion directly bathing or showering the whole fruits, thus covering not only the sites of infection, but also the whole fruit with fungicide, finally leaving the whole fruit with fungicide residues. With these treatments, considerable amounts of synthetic fungicides (potentially toxic for humans and the environment) are unnecessarily introduced into the food chain, and therefore the authorities establish an MRL (maximum residues level) for each fungicide in each fruit and vegetable product in order to regulate this problem. These MRL are the cause of a continuous controversy and update and are frequently deemed as insufficient by NGOs and supermarkets, which further restrict the acceptable residue level for the sale of their products.

In order to reduce the amount of fungicide incorporated into fruits, an interesting approach would be to target and release fungicide only to the site of infection, that is, the site where the infection begins and, thus, the rotting of the fruit.

If only the sites of infection of the plant tissue were treated by means of a selective and controlled treatment, targeted to said sites of infection, the amount of fungicide incorporated to the fruits would be radically lower, since, for example, in manufacturing warehouses, the fruits with small wounds, some of them almost imperceptible to the human eye, are precisely the ones passing the sorting line and reaching the consumer. These small wounds account for a tiny part of the surface of the fruit, such that the introduction of fungicide only inside them may be a breakthrough since the residue of fungicide on the whole fruit could be almost undetectable, that is, it would be found at trace level. The fruits with very large wounds, on the other hand, are easily detected in a sorting line and never reach the consumer.

Many examples of controlled or sustained release of active materials applied to diverse fields, being pesticides among them, have been described. These are systems which release the active ingredient non-specifically to the medium as a function of time, following a certain kinetic, from the moment in which the product is incorporated into said medium.

From, among the different approaches aiming to achieve this object, it is worth noting the use of mesoporous silica nanoparticles or microparticles, with or without functionalization, in which the active is retained in the pores and is progressively released to the medium (S. Jambhrunkar et al., *J. Colloid Interf. Sci.* 2014, 434, 218-225; A. Janatova et al., *Ind. Crop. Prod.* 2015, 67, 216-220; G. Q. Lu et al., WO2011054046A1; L. B. Yan and C. A. Martin, WO2011061787A2; D. H. Traynor and H. G. Traynor, US20120074603A1; K. Qian et al., *Micropor. Mesopor. Mat.* 2013, 169, 1-6; H. Wanyika, *J. Nanopart. Res.* 2013, 15:1831, 1-9; J. Chen et al., *J. Agric. Food Chem.* 2011, 59, 307-311; M. Otsuka et al., *J. Control. Release* 2000, 67, 369-384; Kortesuo et al., *J. Control. Release* 2001, 76, 227-238). This approach is especially useful for applications in which it is interesting to have a product "reservoir", when it is interesting to progressively apply the product or when it is interesting to protect the product from the medium. However, it is not very convenient for treating selectively the sites of infection with fungicides, as it implies the use of unspecific systems. Thus, processing waters would accumulate fungicides over time depending on the kinetics of the product and would be polluted with residues. Likewise, these fungicides in water would pass into fruits unspecifically, leaving residues all over the surface. On the other hand, the release shall not be progressive, as it is best to have all the dose available at the moment of treatment in order to eradicate the infection within the permissible delay time between inoculation and treatment. Otherwise, the treatment loses its effectiveness (B. L. Wild and L. J. Spohr, *Aust. J. Exp. Agr.* 1989, 29, 139-142).

On the other hand, there are many examples described about selective and targeted release, also applied to very diverse fields, wherein the release is zero until a stimulus triggers the release of the active material. In this approach, it is worth mentioning the systems based on mesoporous silica gel particles wherein the pores loaded with active material are closed with molecular gates sensitive to specific stimuli. When the stimulus occurs, the gates are open and the active is released (C. Coll et al., *Accounts Chem. Res.* 2013, 46, 339-349). The stimulus capable of opening said molecular gates may be the presence of an enzyme capable of degradating the molecules acting as gates (A. Bernardos et al., *Angew. Chem. Int. Ed.* 2009, 48, 5884-5887; N. Mas et al., *Chem. Eur. J.* 2013, 19, 1346-1356; C. Coll et al., *Angew. Chem. Int. Ed.* 2011, 50, 2138-2140; A. Agostini et al., *Anger. Chem. Int. Ed.* 2012, 51, 10556-10560; A. Agostini et al., *Langmuir* 2012, 28, 14766-14776; A. Bernardos et al., *ACS Nano* 2010, 4, 6353-6368), the presence of a specific molecule capable of interacting with the gates and opening them (M. Chen et al., *Chem. Commun.* 2012, 48, 9522-9524; E. Climent et al., *J. Am. Chem. Soc.* 2009, 131, 14075-14080; R. Casasus et al., *J. Am. Chem. Soc.* 2008, 130, 1903-1917; A Bernardos et al., *J. Control. Release* 2008, 131, 181-189; Q. Yang et al., *Chem. Mater.* 2005, 17, 5999-6003; R. Casasus et al., *J. Am. Chem. Soc.* 2004, 126, 8612-8613), a change in pH (R. Casasus et al., *J. Am. Chem. Soc.* 2008, 130, 1903-1917; A. Bernardos et al., *J. Control. Release* 2008, 131, 181-189; R. Casasus et al., *J. Am. Chem. Soc.* 2004, 126, 8612-8613) or a change in temperature (E. Aznar et al., *Angew. Chem. Int. Ed.* 2011, 50, 11172-11175), among others.

This application may be adequate in principle for the selective treatment of sites of infection, such as for example wounds, with fungicides, since the release would be theoretically zero in processing waters and also on the surface of the fruit and the fungicide would be released only as a consequence of a stimulus capable of opening the molecular gates produced by the wound or by the fungus itself inoculated at the site of infection. One of the most feasible options would be producing an enzymatic opening caused by any hydrolytic enzyme produced by the fungus itself inoculated at the site of infection. However, the gap generated between the onset of the infection and the moment when the complete dose is reached by the opening of the gates could make the treatment ineffective, since the opening of said gates would be precisely the consequence of the growth of the fungus. That is, when the growing fungus produces sufficient enzyme to open enough gates and deliver a good treatment dose, it will be already in an advanced stage of growth and it would be probably too late to eradicate it.

For treatment to be selective and also effective, the product should be capable of maintaining a zero-fungicide release in the treatment water and on the surface of the fruit and at the same time releasing said fungicide instantaneously on the site of infection, without time gaps, as the effectiveness of the same is highly dependent of the time elapsed between inoculation and treatment, which in turn corresponds to the time of advance of the infection.

The present invention overcomes this problem through a system able to hold and release the fungicide only selectively at the site of infection, but at the same time being totally open, without gates, for the free and immediate release of the whole fungicide dose at the site of infection.

OBJECT OF THE INVENTION

The main object of the invention is a porous silica particle partially functionalized with moieties of long hydrocarbon chains, characterized in that it is loaded with a fungicidal agent retained by non-covalent interactions with the long hydrocarbon chains. This particle will be hereinafter referred to indistinctly as the particle or particles of the invention.

Another object of the present invention is a method for preparing the porous silica particles of the invention comprising functionalization of the silica particles with long hydrocarbon chains and loading of the particles functionalized with the fungicidal agent.

Another important object of the invention is a system for the controlled and targeted release of fungicides over the sites of infection of plant tissues comprising the particles of the invention suspended in an aqueous buffered solution at a pH in which the fungicidal agent stays in its non-ionic form. This system will be hereinafter referred as the system of the invention.

An additional object of the present invention is the use of the particles of the invention or of the system of the invention for a fungicide treatment directed to the sites of infection of plant tissues.

A last object somewhat connected to the latter relates to a method to avoid the rotting caused by fungi in vegetable and fruit products without producing free fungicide residues in processing and washing water and reducing the fungicide residue to trace level, comprising:

a) treating the fruit and vegetable product by showering, misting, spraying, fumigating or immersing in system for the controlled and targeted release of fungicides of the invention, b) removing the excess particles from the surface of the fruit and vegetable products by means of brushing, compressed air, washing with water or with and aqueous solution, or any combination of the foregoing.

Figure 11:
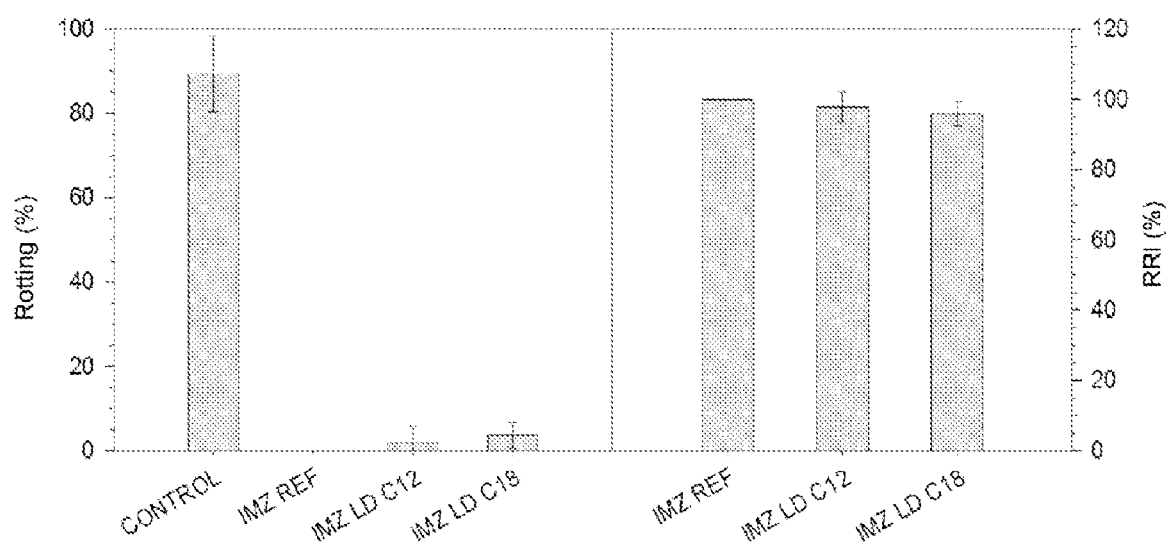

FIG. 11: Rotting (%) and rotting reduction index (%), DRI, in lemons of the Prima Fiori variety inoculated with *P. digitatum* after 7 days at RH 85% and 22° C. treated with 6 g/l of (IMZ)SG-C18-OH or (IMZ)SG-C12-OH in etidronic buffer 10 mM, pH=7.5 (IMZ LD C18 and IMZ LD C12, respectively), with an aqueous solution of imazalil sulfate at 450 mg/l (IMZ REF) or with tap water (CONTROL).

Figure 12:
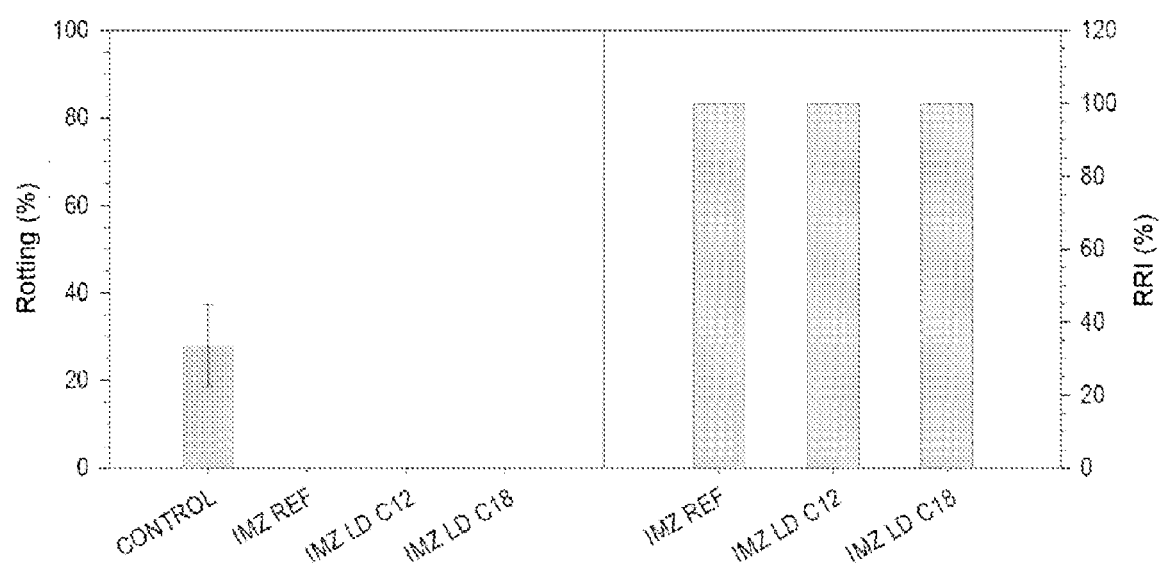

FIG. 12: Rotting (%) and rotting reduction index (%), DRI, in tangerines of the Nadorcott variety inoculated with *P. digitatum* after 7 days at RH 85% and 22° C. treated with 6 g/l of (IMZ)SG-C18-OH or (IMZ)SG-C12-OH in etidronic buffer 10 mM, pH=7.5 (IMZ LD C18 and IMZ LD C12, respectively), with an aqueous solution of imazalil sulfate at 450 mg/l (IMZ REF) or with tap water (CONTROL).

Figure 13:
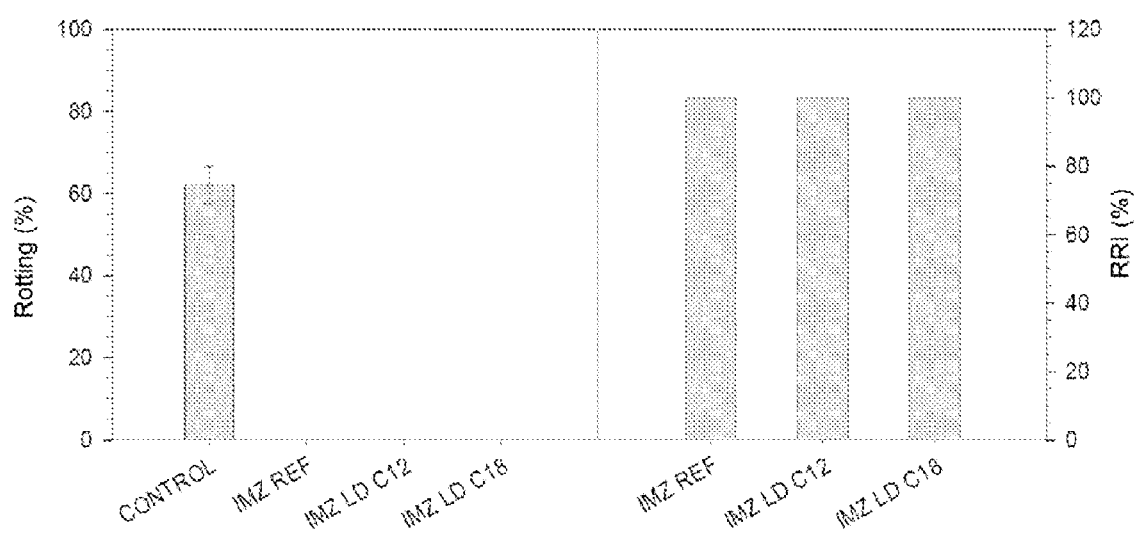

FIG. 13: Rotting (%) and rotting reduction index (%), DRI, in grapefruits of the Star Ruby variety inoculated with *P. digitatum* after 7 days at RH 85% and 22° C. treated with 6 g/l of (IMZ)SG-C18-OH or (IMZ)SG-C12-OH in etidronic buffer 10 mM, pH=7.5 (IMZ LD C18 and IMZ LD C12, respectively), with an aqueous solution of imazalil sulfate at 450 mg/l (IMZ REF) or with tap water (CONTROL).

Figure 14:
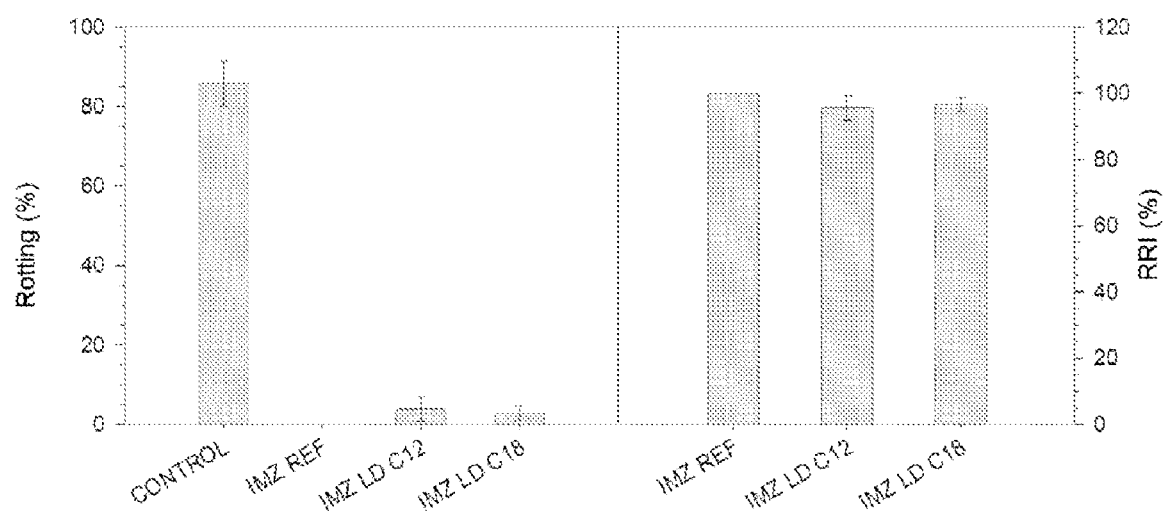

FIG. 14: Rotting (%) and rotting reduction index (%), DRI, in oranges of the Valencia variety inoculated with *P. italicum* after 7 days at RH 85% and 22° C. treated with 6 g/l of (IMZ)SG-C18-OH or (IMZ)SG-C12-OH in etidronic buffer 10 mM, pH=7.5 (IMZ LD C18 and IMZ LD C12, respectively), with an aqueous solution of imazalil sulfate at 450 mg/l (IMZ REF) or with tap water (CONTROL).

Figure 15:
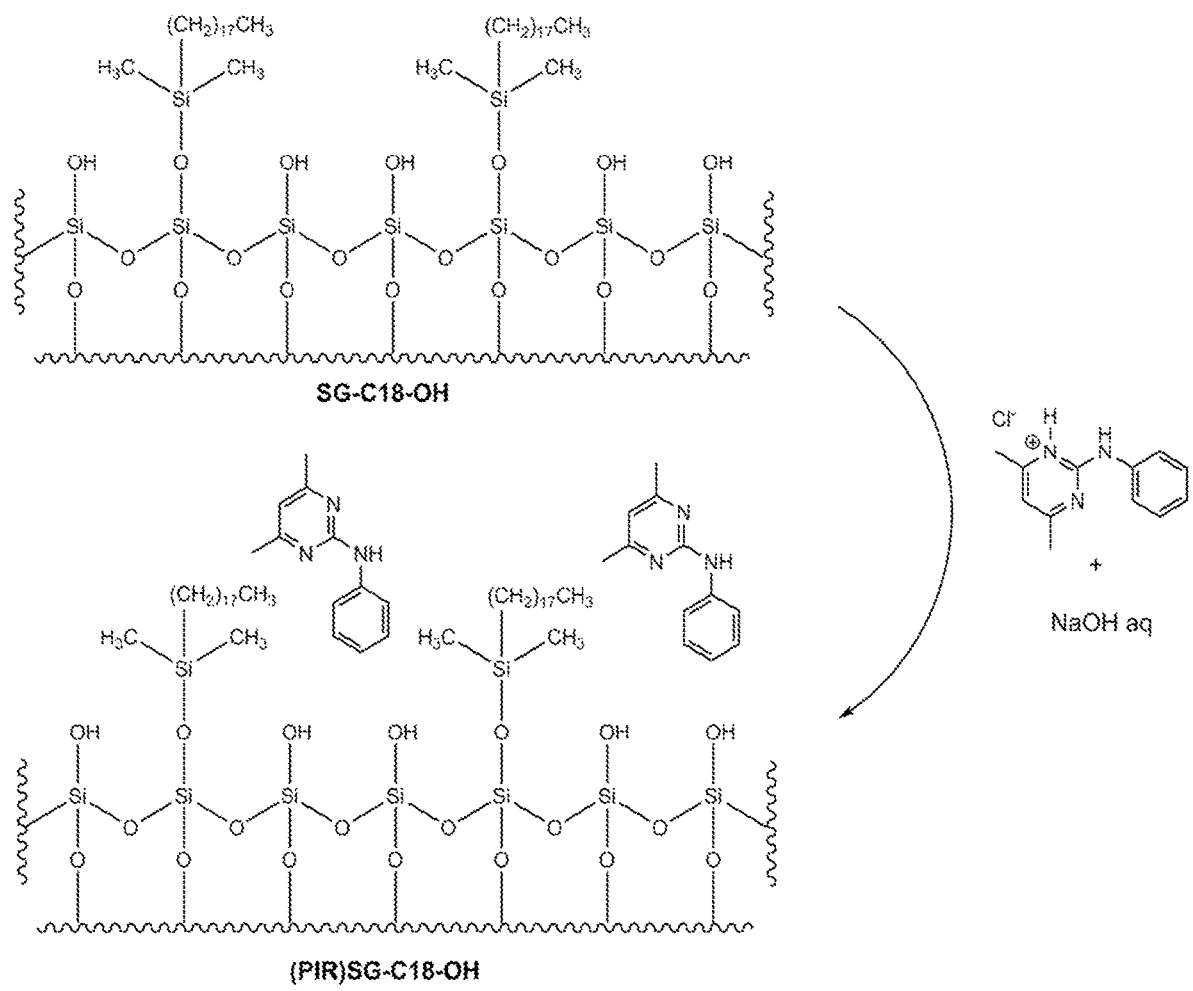

FIG. 15: representation of the load of SG-C18-OH with pyrimethanil (PIR).

Figure 16:
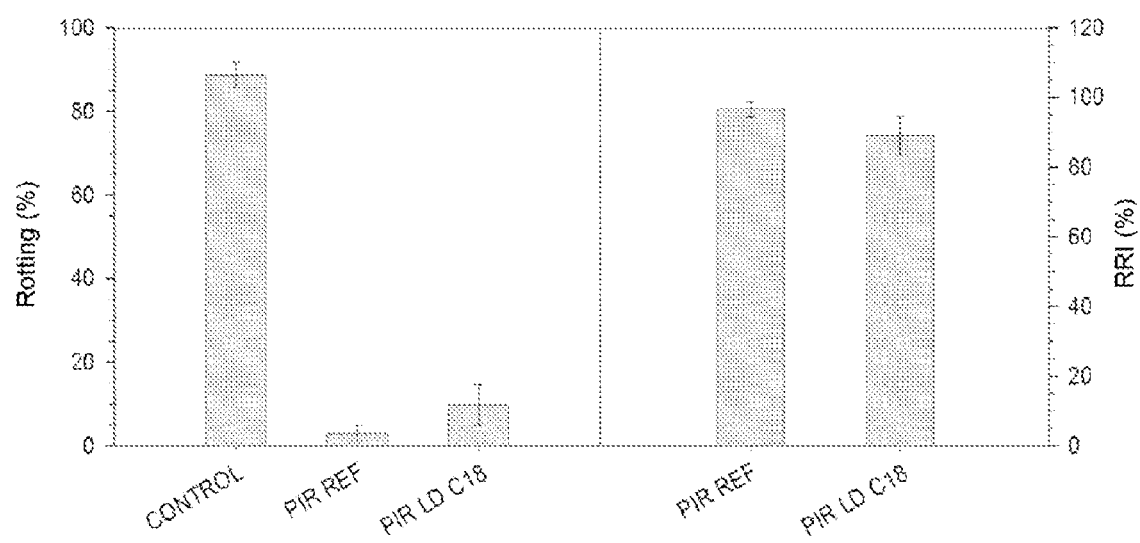

FIG. 16: Rotting (%) and rotting reduction index (%), DRI, in oranges of the Valencia variety inoculated with *P. digitatum* after 7 days at RH 85% and 22° C. treated with 14 g/l of (PIR)SG-C18-OH in etidronic buffer 10 mM, pH=7.5 (PIR LD C18), with an aqueous solution of pyrimethanil at 525 mg/l (PIR REF) or with tap water (CONTROL).

Figure 17:
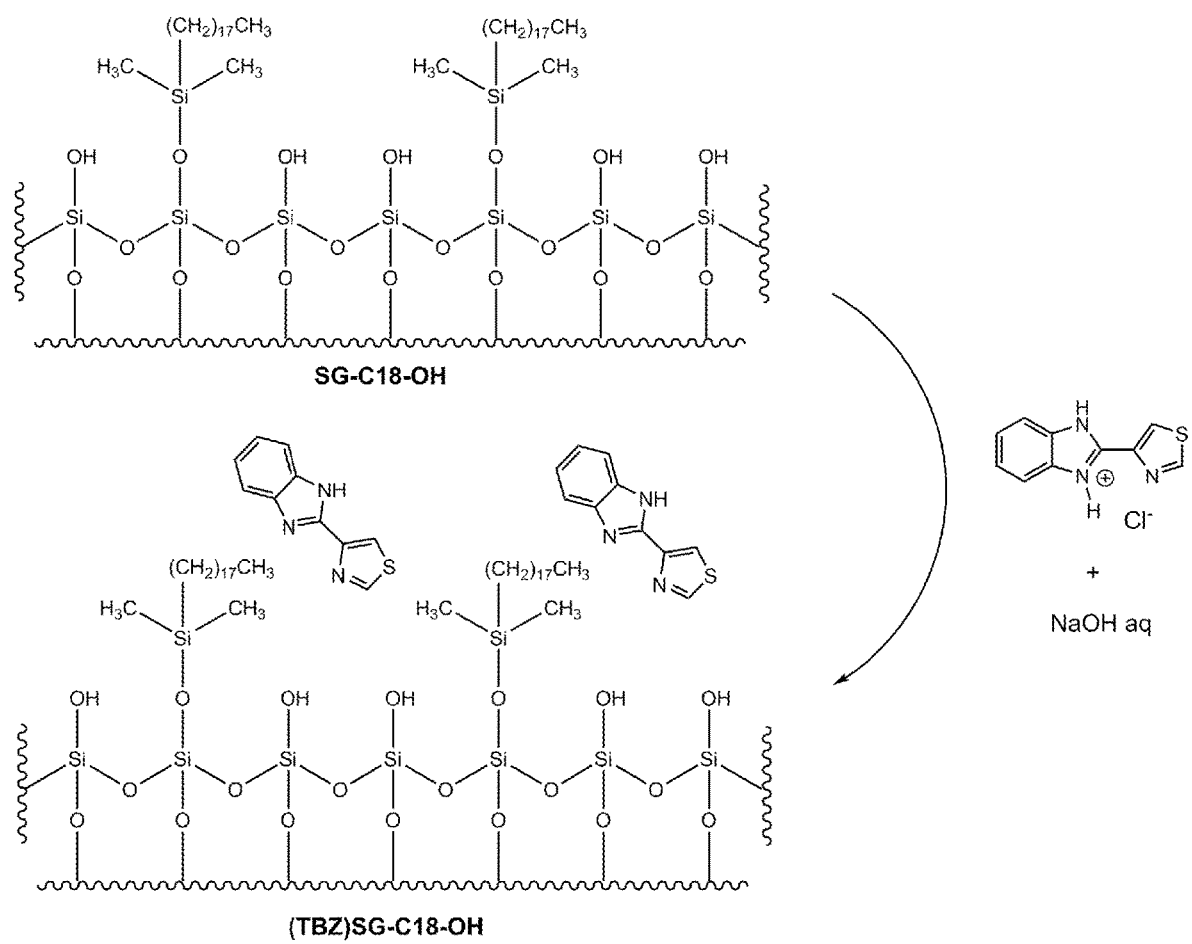

FIG. 17: representation of the load of SG-C18-OH with thiabenzadol (TBZ).

Figure 18:
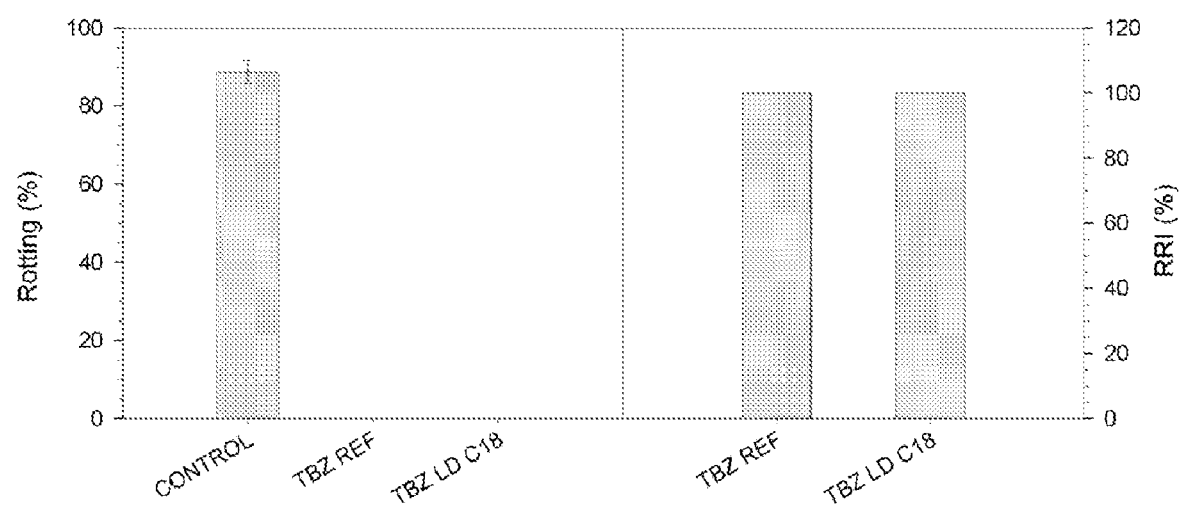

FIG. 18: Rotting (%) and rotting reduction index (%), DRI, in oranges of the Valencia variety inoculated with *P. digitatum* after 7 days at RH 85% and 22° C. treated with 16 g/l of (TBZ)SG-C18-OH in etidronic buffer 10 mM, pH=7.5 (TBZ LD C18), with an aqueous solution of thiabenzadol at 1200 mg/l (TBZ REF) or with tap water (CONTROL).

DETAILED DESCRIPTION OF THE INVENTION

The following definitions are provided in order to facilitate the understanding and of clarifying the meaning of certain terms within the context of the present invention.

"Porous silica particle": relates to a silica particulate element porous in nature acting as support for the long hydrocarbon chains and wherein the fungicidal agent is retained. The term particle encompasses, within the context of the invention, both nanoparticles and microparticles which may be microporous, mesoporous or macroporous and which nature may be synthetic or natural.

"Partially functionalized": relates to the degree in which the silanol moieties present on the surface of the silica are linked by covalent bonds with the long hydrocarbon chains. The degree of functionalization of the silica may be measured by means of the concentration of free silanol groups on the surface of the silica. The silica having a surface concentration of free silanols between 2 and 8 $\mu mol/m^2$ is deemed as partially functionalized.

"Long hydrocarbon chain": relates, within the context of the invention, to a linear or branched, saturated or unsaturated hydrocarbon chain with between 8 to 20 carbon atoms, which may comprise between 0 and 10 heteroatoms selected from the group consisting of S, O and N.

"Fungicidal agent" or "fungicide": relates to any chemical compound capable of causing the death of fungal cells or inhibiting and/or suppressing their growth and which chemical nature could be basic, acid or without a noteworthy acid-base behavior. The fungicidal agent may be retained inside the particles due to non-covalent interactions with the long hydrocarbon chains.

"Non-covalent Interactions": relates to any interaction between atoms wherein no electrons are shared. It encompasses 4 main groups of interactions: electrostatic interaction (between charged molecules and ions), intermolecular Van der Waals forces (between dipole-dipole, dipole-induced dipole and induced dipole-induced dipole), hydrogen bonds and hydrophobic interactions.

"Microporous": implies that the pore size of the silica particle is equal or lower than 2 nm.

"Mesoporous": implies that the pore size of the silica particle may range between 2-50 nm.

"Macroporous": implies that the pore size of the silica particle is equal or greater than 50 nm.

"Polysaccharides": relates to linear or branched polymers formed by binding 2 to 20 monosaccharide units, selected from the group consisting in ribose, arabinose, xylose, lyxose, allose, altrose, glucose, mannose, gulose, idose, galactose, tallose, ribulose, xylulose, sicose, fructose, sorbose and tagatose. Within the context of the present invention, the polysaccharides may be linked to the free silanol moieties present on the surface of the silica particles once functionalization has occurred with long hydrocarbon chains or may be also linked to the same hydrocarbon chains on the end opposite to that anchored to the silica or on one of its branches. The list of polysaccharides useful within the context of the present invention encompasses, without limitation saccharose, lactose, maltose, isomaltose, cellobiose, cellodextrins, maltodextrins and cellulose hydrolizates and starch in general.

"Polyethylene glycols": they are polyethers which chemical structure may be represented as HO—$(CH_2$—$CH_2$—$O$—$)_n$—H, being n a number between 2 and 455. Within the context of the present invention, the polyethylene glycols may be linked to the free silanol moieties present on the surface of the silica particles once functionalization has occurred with long hydrocarbon chains or may be also linked to the same hydrocarbon chains on the end opposite to that anchored to the silica or on one of its branches. The list of polyethylene glycols useful within the context of the present invention encompasses, without limitation PEG-200, 300, 400, 600, 800, 1000, 1500, 3350, 4000, 6000 and 8000.

"Silica of synthetic origin": relates to the silica obtained by chemical synthesis, such as, for example, silica gel.

"Silica of natural origin": relates to the silica of natural origin, such as, for example, diatomaceous earth.

"Silica precursor": is the substance which reaction results in the synthesis of silica. From among other silica precursors, tetramethyl orthosilicate, tetraethyl orthosilicate, tetrapropyl orthosilicate, tetrabutyl orthosilicate, tetraisopropyl orthosilicate or tetrahexyl orthosilicate may be mentioned.

"Substance precursor of pore formation" or "pore precursor": relates to the component in the synthesis reaction of silica which function is facilitating the occurrence of pores. From among other precursor substances of pore formation it is worth mentioning the amphiphilic block copolymers of the family of poloxamers, such as Synperonics, Pluronics and Kolliphor or alkyltrimethylammonium halides, such as hexadecyltrimethylammonium bromide, octadecyltrimethylammonium bromide, dodecyltrimethylammonium chloride, hexyltrimethylammonium bromide or octyltrimethylammonium chloride.

"Controlled release": relates to the ability possessed by the particles of the invention to retain the fungicidal agents with which they are indefinitely loaded when they are in aqueous buffer solution or on the fruit and to release them only when the adequate stimulus occurs at the site of infection.

"Targeted release": relates to the ability possessed by the particles of the invention to emit or release instantaneously the fungicidal agents with which they are loaded only when the adequate stimulus occurs at the sites of infection.

"Site or sites of infection": it is the area of plant tissue where the fungus initiate or may initiate infection once inoculated on the same. The sites of infection are openings on the surface of the plant where the pathogen enters, allowing it to gain access to the nutrient-rich tissues under the epidermis, and allow them to cause the infection. These may be wounds present on the surface, natural openings and in some instances, openings generated by the fungus by means of enzymes and specialized organs.

"Plant tissues": within the context, it relates to the plant cell structures amenable to be infected by fungus. Within the context of the invention, the term plant tissues relates particularly to the outer and surface cell structures of the plants to be treated and more particularly and preferably to the outer surface of the vegetable and fruit products.

"Buffered solution at a pH in which the fungicidal agent stays in its non-ionic form": relates to the element of the system for the controlled and targeted release of fungicides of the invention which allows to retain the fungicide in a non-ionic form inside the particles of the invention. The pH of the buffered solution should be different as a function of the chemical nature of the fungicide retained inside the particles. In the case of basic fungicides capable of being protonated forming water-soluble cationic species, the pH of the buffer should be kept at a pH of at least 1 point above the pKa of the fungicide. In the case of acid fungicides capable of being deprotonated to form water-soluble anionic species, the pH of the buffer is kept at least 1 point below the pKa of the fungicide.

"Vegetable and fruit products": relates to all the vegetable products included in the group of fruits or vegetables. The list of products included in the group of fruits comprises, without limitation, citrus, fruits with pits, fruits with small seeds, fruits with grains, tropical fruits, and berries; whereas the list of products included in the group of vegetables, on the other hand, comprises, without limitation, the families of the nightshades, liliaceae, chenopodiaceae, umbelliferae, convolvulaceae, composites, curcubitaceae, cruciferae, legumes and grasses.

"Free fungicide": relates to the fungicide not bound to the particles that remains present in processing or washing waters of the products already treated, which may be potentially harmful for the environment and for the operators who carry out the fungicidal treatment and which may pass freely to the fruits, thus increasing the residue on the same.

"Trace level": relates to fungicide concentrations <0.1 mg/kg in the fruit.

"Excess particles": relates to the particles that remain on the surface of the treated plant and fruit product, which has not released its content and thus may be recovered and reused in a new treatment.

The Particle

The main aspect of the invention relates to porous silica particles partially functionalized with moieties of long hydrocarbon chains, characterized in that they are loaded with a fungicidal agent retained by non-covalent interactions with the long hydrocarbon chains.

Figure 1A:
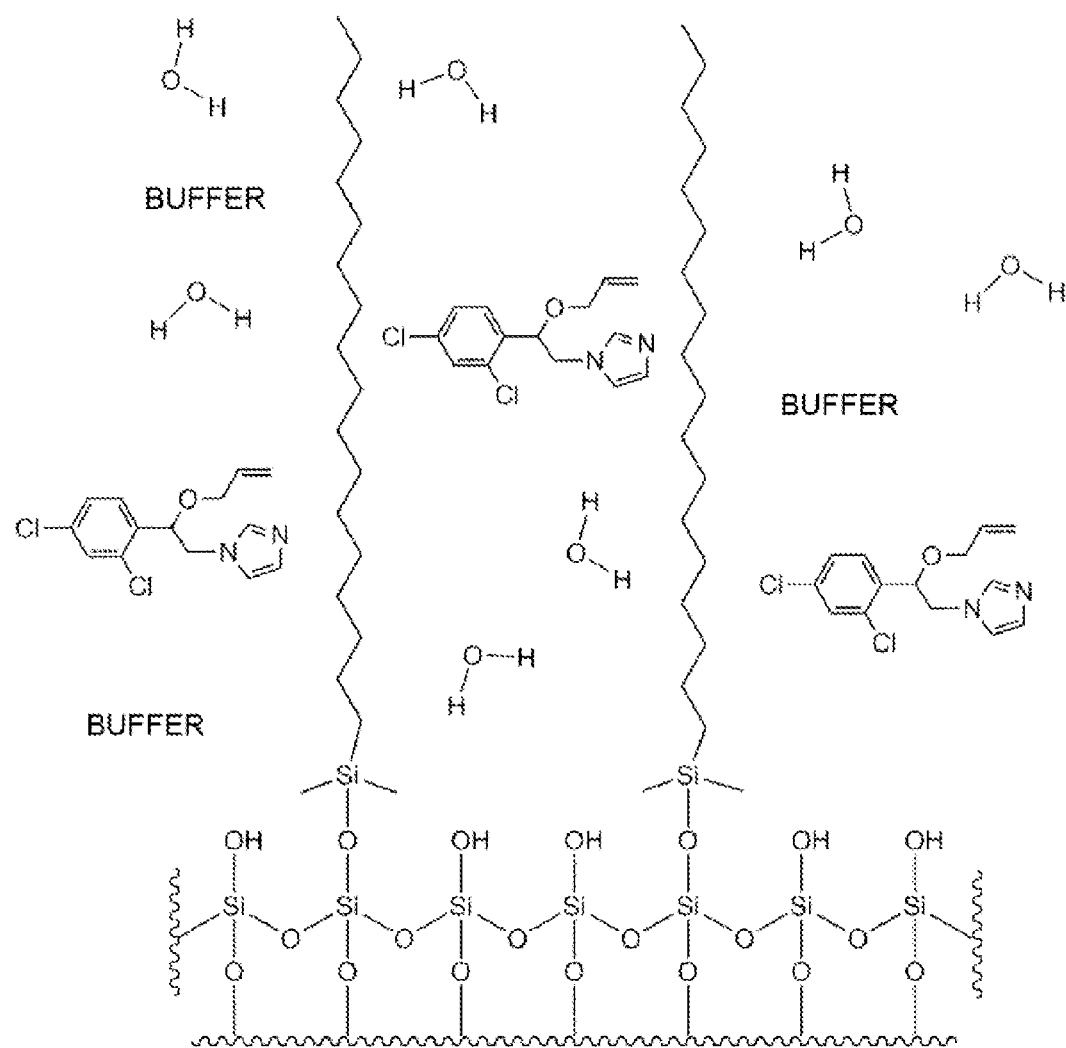
FIG. 1A: represents the surface of a partially functionalized silica particle according to the invention. The fungicide, in this case imazalil, in its non-ionized state is retained by means of non-covalent interactions with the hydrocarbon chains.
Figure 1B:
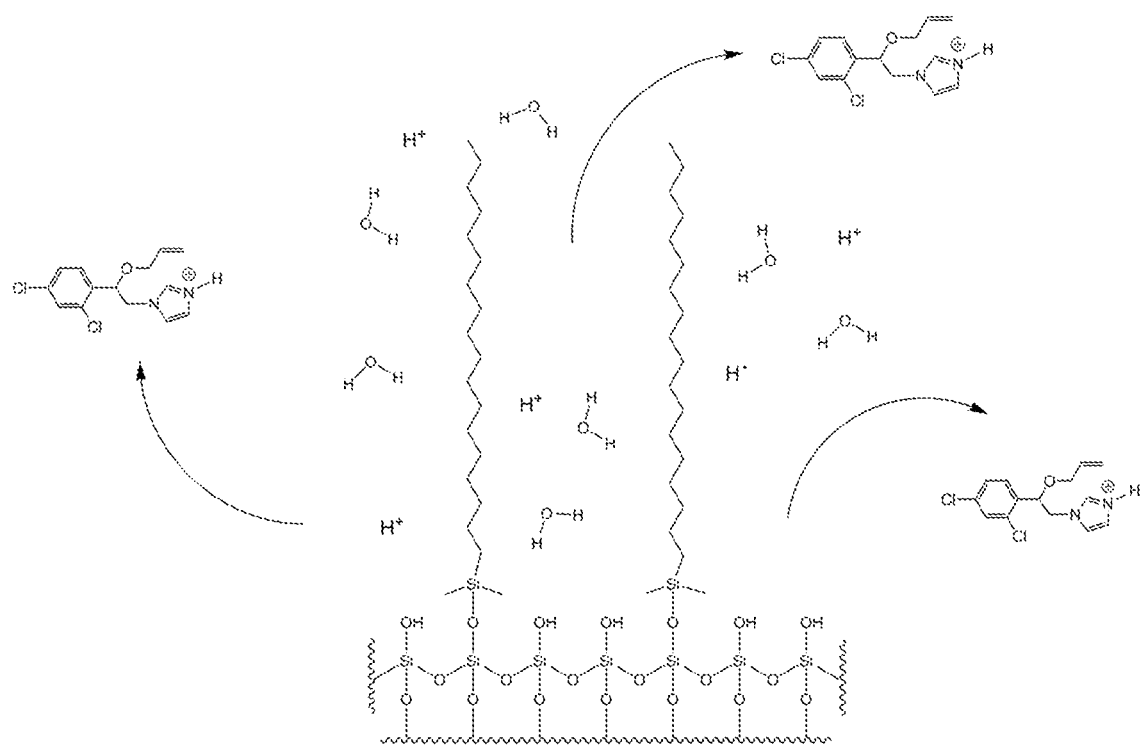
FIG. 1B: represents the surface of a partially functionalized silica particle according to the invention. The fungicide, in this case imazalil, in its ionized state (after being protonated in acid medium) is released from the particles to the outer aqueous medium.

The present invention is based on the ability possessed by said particles of the invention to retain the fungicidal agent(s) in their non-ionized (lipophilic) form by means of non-covalent interactions, mainly hydrophobic interactions and Vand der Waals forces, with said hydrocarbon chains. FIG. 1A represents schematically the way how the fungicide, imazalil in the present case by way of example, is retained inside the particles by means of non-covalent interactions with the hydrocarbon chains in a medium buffered at pH 7.5 which allow it to retain its non-ionic (lipophilic) form. When an adequate stimulus of the medium which eventually allow for the ionization of the fungicidal agent, such as, for example, a pH change occurs, it is capable of becoming soluble in aqueous medium and being released from inside the pores of the particle. In the example shown in FIG. 1B, imazalil is protonated in acid medium, changing to its protonated form, which forces the release from the particles to the outer medium.

One of the essential elements of the particles of the inventions is the silica particle itself, which is used as a support for the functionalization and ultimately functions as reservoir of the fungicidal agent. The porous silica particle of the invention may have a particle size comprised within the range of 0.02-500 μm, preferably 1-200 μm and more preferably 20-100 μm.

The silica may have a very diverse pore size and in this sense microporous (with a pore size equal or lower than 2 nm), mesoporous (with a pore size between 2 nm and 50 nm) or macroporous (with a pore size equal or bigger than 50 nm) silica may be used. The preferred embodiment implies the use of mesoporous silica.

Any type of porous silica, either synthetic, such as, for example, silica gel, or natural, such as diatomaceous earth may be used in the present invention.

Another one of the fundamental elements of the particles of the invention are the long hydrocarbon chains coating the inner surface thereof. The particles of the invention are partially functionalized with these long hydrocarbon chains which allow them to hold the fungicidal agent inside the particle by means of the aforementioned non-covalent interactions. The long hydrocarbon chains may be linear or branched, saturated or unsaturated with between 8 to 20 carbon atoms and may comprise between 0 and 10 heteroatoms selected from the group consisting of S, O and N.

In a particular embodiment, the hydrocarbon chains have between 8 and 19 carbon atoms and preferably between 12 and 18 carbon atoms.

A series of particular and preferred embodiments of the invention comprise a functionalization pattern of the surface of the silica particles according to the following surface structures:

(I)

(II)

(III)

wherein $R_1$ and $R_2$ are linear or branched, saturated or unsaturated hydrocarbon chains of 1 to 5 carbon atoms, which may comprise between 0 and 3 heteroatoms selected from the group consisting of S, O and N;

$R_3$ is a linear or branched, saturated or unsaturated hydrocarbon chain with 8 to 20 carbon atoms, which may comprise between 0 and 10 heteroatoms selected from the group consisting of S, O and N; and F represents the retained fungicidal agent.

The particles of the invention are only partially functionalized with hydrocarbon chains and this implies that there are free silanol moieties on the surface thereof. The concentration of free silanols is and indirect measure of the degree of functionalization of the particles. In this sense, the particles of the present invention preferably have a surface concentration of free silanols between 2 and 8 $\mu mol/m^2$, preferably between 4 and 7.5 $\mu mol/m^2$.

Another way to assess the degree of functionalization of the particles is by the weight provided exclusively by introducing the hydrocarbon moieties. This is assessed when comparing the weight if the silica particles before and after the functionalization with the hydrocarbon chains. This weight difference is expressed as carbon content, which in turn may be measured experimentally by means of an elemental analysis. In the particles of the invention, the carbon content (w/w), provided exclusively by introducing the long-chain hydrocarbon moieties, is preferably between 5% and 20% and preferably between 10% and 15% of the total weight of the particles In order to apply them in the fungicidal treatment methods for which they are designed, the particles of the invention should be easily dispersed in water to ensure homogeneous and efficient treatments, since water is the medium used in the treatments of bathing or showering vegetable products. The particles loaded with fungicide of the invention have a good water dispersibility as they are amphiphilic particles, with a good balance between hydrocarbon chain moieties (lipophilic, responsible for the retention of fungicides) and non-functionalized silanol moieties (hydrophilic, responsible for providing water dispersibility). High loads of hydrocarbon chains, as well as the use of chains with a higher number of carbon atoms, confer a higher fungicide retention capability, but they make the product highly lipophilic and decrease its water dispersibility, essential in order to apply the treatment on the plant product to be treated. Likewise, low loads of hydrocarbon chains, as well as the use of chains with a lower number of carbon atoms, confer a high water dispersibility, but a lower capability to retain the fungicides. Said balance between the degree of functionalization (as well as the nature of the hydrocarbon chains) and the free silanols will likewise depend on the nature of the fungicidal agent used in preparing the particles of the invention and the degree of retention required.

In any case, a way to increase the hydrophilic character of the particles and thus improve the dispersibility for those applications that require it, consists in the total or partial functionalization of the free silanol moieties present on the silica with another type of polar molecules that enable or ease their water dispersibility after the functionalization with the hydrocarbon chains. For example, in a particular embodiment of the invention, the free silanol groups of the particles may be totally or partially functionalized with polar moieties, preferably selected from the group of the polysaccharides, polyethylene glycols or hydrocarbon chains ending in amino, carboxylate, sulfonate, phosphonate or quaternary ammonium salt moieties.

A particular embodiment of the invention contemplates that, for the functionalization patterns of the surface of the silica particles described and schematized above for the surface structures I), II) and III), the substituents $R_1$, $R_2$ or $R_3$ are functionalized on the end opposite to that anchored to the silica or on one of its branches with polar moieties, preferably selected from the group of the polysaccharides, polyethylene glycols, or amino, carboxylate, sulfonate, phosphonate or quaternary ammonium salt moieties.

The last essential element of the particles of the invention is the fungicidal agent. The particles of the invention are amenable to be loaded with any type of fungicide, independently of its chemical nature. The fungicides may be basic or acid fungicides or without a noteworthy acid-base behavior. The particles of the invention may be loaded with a single fungicidal agent or with a mixture of two or more fungicides. However, the preferred embodiment of the invention contemplates the load of the particles with a single fungicidal agent.

In the particles of the invention, the loaded fungicidal agent represents between 2% and 20% (w/w) with respect to the total weight of the particle, and preferably between 5% and 15%.

In a particular embodiment the fungicidal agent is selected from the group consisting in o-phenylphenol, benomyl, carbendazim, fuberidazole, tiabendazole, thiophanate, methyl thiophanate, chlozolinate, iprodione, procymidone, vindozolin, imazalil, oxyconazole, pefurazoate, prochloraz, triflumizole, triforine, pyrifenox, phenarimole, nuarimole, azaconazole, bitertanole, bromuconazole, cyproconazole, difenoconazole, diniconazole, epoxiconazole, fenbuconazole, fluquinconazole, flusilazole, flutriafole, hexaconazole, imibenconazole, ipconazole, metconazole, myclobutanil, penconazole, propiconazole, protioconazole, simeconazole, tebuconazole, tetraconazole, triadimefon, triadimenol, triticonazole, benalaxyl, furalaxyl, metalaxyl, mefenoxam, oxadixyl, ofurace, aldimorf, dodemorf, fenpropimorf, tridemorf, fenpropidine, piperaline, spiroxamine, edifenphos, iprobenphos, pirazophos, isoprothiolane, benodanyl, boscalid, carboxin, fenfuram, flutolanil, furametpir, mepronil, oxycarboxine, pentiopirad, thifluzamide, bupirimate, dimethirimol, ethirimol, cyprodinil, mepanipirim, pyrimethanil, diethofencarb, azoxystrobin, enestrobin, picoxystrobin, pyradostrobin, kresoxim-methyl, trifloxystrobin, dimoxystrobin, metominostrobin, orysastrobin, famoxadone, fluoxastrobin, fenamidone, fenpiclonyl, fludioxonil, quinoxyfen, biphenyl, chloroneb, dichloran, quintozene, tecnazene, tolclophos-methyl, etridiazole, phthalide, pyroquilon, tricyclazole, carpropamide, didocymet, fenoxanyl, fenhexamid, pyributicarb, naphtiphine, terbinaphine, polyoxyne, pencycurone, cyazofamid, zoxamide, blasticidin S, kasugamycin, streptomycin, validamycin, cymoxanil, iodocarb, propamocarb, prothiocarb, binapacryl, dinocap, ferimzone, fluazinam, fentin acetate, fentin chloride, fentin hydroxide, oxolinic acid, hymexazol, octilinone, fosetyl-Al, phosphorous acid and its salts (for example, potassium phosphite and calcium phosphite), teclophtalam, triazoxide, flusulphamide, diclomezine, silthiofam, diflumetorim, dimetomorf, flumorf, bentiavalicarb, iprovalicarb, mandipropamid, oxytetracycline, methasulfocarb, acibenzolar-S-methil, probenazole, tiadinil, etaboxam, cifiufenamid, proquinazid, metrafenone, fluopicolide, ferbam, mancozeb, maneb, metiram, propineb, tiram, zineb, ziram, captan, captafol, folpet, chlorothalonil, dichlofluanid, tolylfluanid, dodine, guazatine, iminoctadine, anilazine, ditianon, ampropylphos, benzamacryl, betoxazine, buthiobate, chlorosulphamic acid, cyloprate, cyprofuram, diclone, dichlobutrazole, dinoterbon, diphenylamine, dipyrithione, ditalimphos, drazoxolon, etaconazole, phenaminosulf, flumetover, fluoroimide, cis-furconazole, furmeciclox, furofanate, gemtamycin, gliodin, halacrinate, hexachlorophene, korax, dimethyl-dithiocarbamate, 2-methyl-4-chlorophenoxyacetic acid, mercaptobenzothiazole, metalaxil-M, metfuroxam, metsulfovax, milneb, miclozoline, nitrotal-isopropyl, oxycarboxin, oxythioquinox, phosdiphen, phthalamic acid, polycarbamate, polyoxorim, pyracarbolid, pyridinitryl, pyroxifur, quinacetole, quinconazole, sec-butylamine, sodium dehydroacetate. (2-benzothiazolythio)methyl thiocyanate, tetraiodoethylene, ticiofen, tridamide, zarilamide, valifenalate, sedaxane, pyriophenone, penflufen, oxatiapiproline, metam, meptyldinocap, mandestrobin, lyserfenvalpir, isopyrazam, osofetamide, fluxapyroxad, flutianil, fluopyram, fenpyrazamine, dazomet, bixafen, benzovindiflupir, benalaxyl-M, amisulbrom, ametoctradin, 8-hydroxiquinoline, methyl 2,5-dichorobenzoate, chloropycrin, sorbic acid and its salts, benzoic acid and its salts, propionic acid and its salts or combinations thereof.

In a more particular embodiment, the particles are loaded with a fungicidal agent selected among imazalil, tiabendazole, pyrimethanil, cyprodinil, mepanipirim, prochloraz, propiconazole, ortho-phenylphenol, fludioxonil, sorbic, benzoic and propionic acid and their salts or combinations thereof.

The preferred embodiment of the invention contemplates particles loaded with imazalil, pyrimethanil, tiabendazole, prochloraz and fludioxonyl or combinations thereof.

Method for Preparing the Particles

A second object of the present invention is a method for preparing the porous silica particles of the invention comprising the steps of:

a) partially functionalizing the silica particles with long hydrocarbon chains
b) loading the particles functionalized in stage a) with the fungicidal agent, which comprises carrying out any one of the following steps:
   b1) suspending the particles functionalized in stage a) in a concentrated aqueous solution of the fungicidal agent in its ionic form and modify the pH of the solution until bringing the fungicidal agent to its non-ionic form, said agent becoming retained by non-covalent interactions with the hydrocarbon chains inside the particles; or
   b2) suspending the particles functionalized in stage a) in a solution of the fungicidal agent in its non-ionic form with a water-miscible organic solvent and subsequently add water to lower the solubility of the fungicidal agent in the organic solvent and force loading of the silica particle, as the interaction of the fungicidal agent with the long hydrocarbon chains is more favorable than its presence in the solution; or
   b3) suspending the particles functionalized in stage a) in a solution of the fungicidal agent in its non-ionic form with an organic solvent having a low boiling point which subsequently evaporates at low pressure, said fungicidal agent becoming retained inside the silica particles by means of interaction with the hydrocarbon chains.

The partial functionalization with long hydrocarbon chains (step a) may be carried out by two different ways:
i. reacting the silanol moieties of the surface of the silica with reagents of the type alkyltrihalosilane, alkylmethildihalosilane, alkyldimethilhalosilane, alkyltrialkoxysilane, alkylmethildialkoxysilane or alkyldimethilalcoxysilane; or
ii. co-condensing a precursor of the silica with a reagent type alkyltrialkoxysilane, alkylmethildialkoxysilane or alkyldimethilalcoxysilane in the presence of a pore-formation precursor substance, The alkyl moieties of the aforementioned reagents are a linear or branched, saturated or unsaturated hydrocarbon chain with 8 to 20 carbon atoms, which may comprise between 0 and 10 heteroatoms selected from the group consisting of S, O and N.

The first functionalization approach is carried out starting with particles, preferably of silica gel, with sizes comprised between 20 nm and 500 μm and preferably mesoporous. The hydrocarbon chain is introduced in the silica gel by means of a reaction between part of the available silanol moieties on the surface of the silica and a reagent of the alkyltrihalosilane, alkylmethyldihalosilane or alkyldimethylhalosilane type, or of the alkyltrialkoxysilane, alkylmethildialkoxysilane or alkyldimethilalcoxysilane type, wherein the alkyl moiety is a saturated linear or branched, saturated or unsaturated hydrocarbon chain with 8 to 20 carbon atoms, which may comprise between 0 and 10 heteroatoms selected from the group consisting of S, O and N, the halogen of the halosilanes is preferably chlorine, bromine or iodine and the methyl may be substituted with short saturated or unsaturated, linear or branched chains with 1 to 5 carbon atoms which may comprise between 0 and 3 heteroatoms selected from the group consisting of S, O and N. The reaction is usually carried out in a non-protic organic solvent, preferably non-polar and aromatic (toluene, benzene or xylene) and using as base an organic amine, such as, for example, triethylamine, pyridine or imidazole (U. D. Neue, 2006. Silica Gel and its Derivatization for Liquid Chromatography. *Encyclopedia of Analytical Chemistry*; C. A. Doyle y J.

G. Dorsey, 1998. Reversed-Phase HPLC: Preparation and Characterization of Reversed-Phase Stationary Phases. *Handbook of HPLC*; R. P. W. Scott, 1993. Silica Gel and Bonded Phases; V. Řehák y E. Smolková, *Chromatographia* 1976, 9 (5), 219-229; D. C. Locke, *J. Chromatogr. Sci.* 1973, 11 (3), 120-128; K. K. Unger et al., *J. Chromatogr. A* 1976, 125 (1), 115-127; F. Ortega et al., *J. Chem. Educ.* 1996, 73 (2), A26; L. C. Sander and S. A. Wise, *Anal. Chem.* 1984, 56, 504-510; C. du Fresne von Hohenesche et al., *J. Chromatogr. A* 2004, 1025, 177-187; 828, 51-58; L. C. Sander and S. A. Wise, *Anal. Chem.* 1995, 67, 3284-3292; S. S. Hayrapetyan et al., *J. Sep. Sci.* 2006, 29, 810-819; H. Tanaka et al., *J. Chromatogr. A* 1997, 762, 89-96; Y. Sudo et al., *J. Chromatogr. A* 1997, 757, 21-28).

Figure 2:
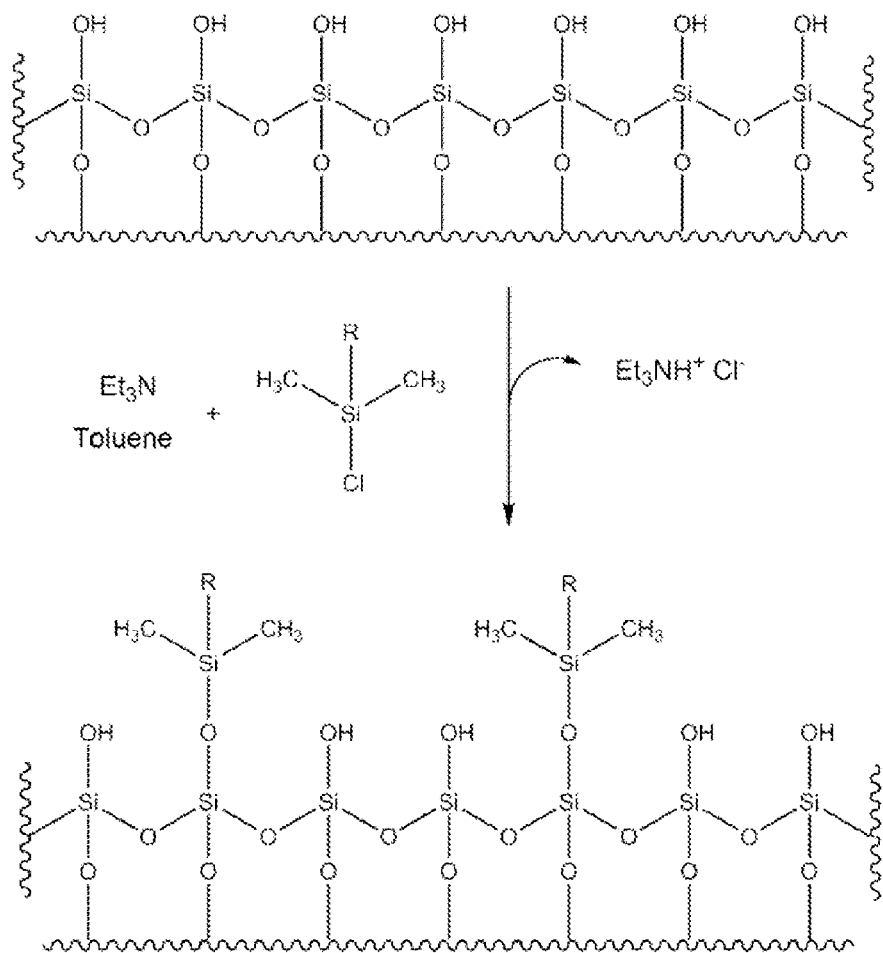
FIG. 2: representation of the functionalization of the silica gel with alkyldimethylchlorosilanes.

One of the preferred embodiments is presented in FIG. 2 and consists in the functionalization of the silica with an alkyldimethylchlorosilane reagent in toluene and using triethylamine as a base.

The ratio between alkylsilane and silica in this reaction is very important to achieve and amphiphilic product, with alkyl groups enough to hold adequately the fungicide and at the same time enough free and accessible silanol groups to confer enough polarity to the product, such that it is easily dispersed in water. Such ratio depends on the amount of fungicide to be loaded and also on the physicochemical characteristics of the fungicide to be loaded. The greater the need for retention, the bigger is the proportion of alkylsilane used.

The functionalized silica should contain between 5% and 20% of carbon provided only by the introduction of long hydrocarbon chain moieties and a surface concentration of free silanols preferably between 4 and 7.5 $\mu mol/m^2$. Note that this approach implies leaving a large number of free silanols so that the material is amphiphilic and, thus, differs substantially from the standard alkylation of the silica for obtaining stationary phases for reverse phase chromatography.

The second possible approach of functionalization within the context of the invention consists in the de novo synthesis of the silica particles with the already incorporated hydrocarbon chain moieties. This process is carried out by co-condensation starting from a precursor of silica (such as TEOS, tetraethyl orthosilicate), the alkyltrialkoxysilane corresponding to the chain to be introduced and a surfactant acting as a template for generating pores, preferably from the family of alkyltrimethylammonium chloride or from the family of the amphiphilic block copolymers. The alkyltrialkoxysilane may be substituted by alkylmethyldialkoxysilane or alkyldimethylalkoxysilane. The co-condensation reaction between the alkoxysilanes is carried out preferably in aqueous or hydroalcoholic medium and employing acid or basic catalysis. Once finished, the pore-precursor surfactant is removed from the pores by extraction (Trewyn et al., *Acc. Chem. Res.* 2007, 40, 846-853; S. Huh et al., *Chem. Mater.* 2003, 15, 4247-4256; M. Barczak et al.; *Journal of Physics: Conference Series* 2009, 146, 012002; R. P. Bagwe et al.; *Langmuir* 2006, 22 (9): 4357-4362; J. Kecht et al., *Chem. Mater.* 2008, 20 (23), 7207-7214; E. Murray et al., *Adv. Eng. Mater.* 2010, 12(5), 374-378). The alkyl moiety is a saturated linear or branched, saturated or unsaturated hydrocarbon chain with 8 to 20 carbon atoms, which may comprise between 0 and 10 heteroatoms selected from the group consisting of S, O and N. The alkoxy moieties are formed by a linear or branched, saturated or unsaturated alkyl chain which may comprise between 0 and 3 heteroatoms selected from the group consisting in S, O and N.

Figure 3:
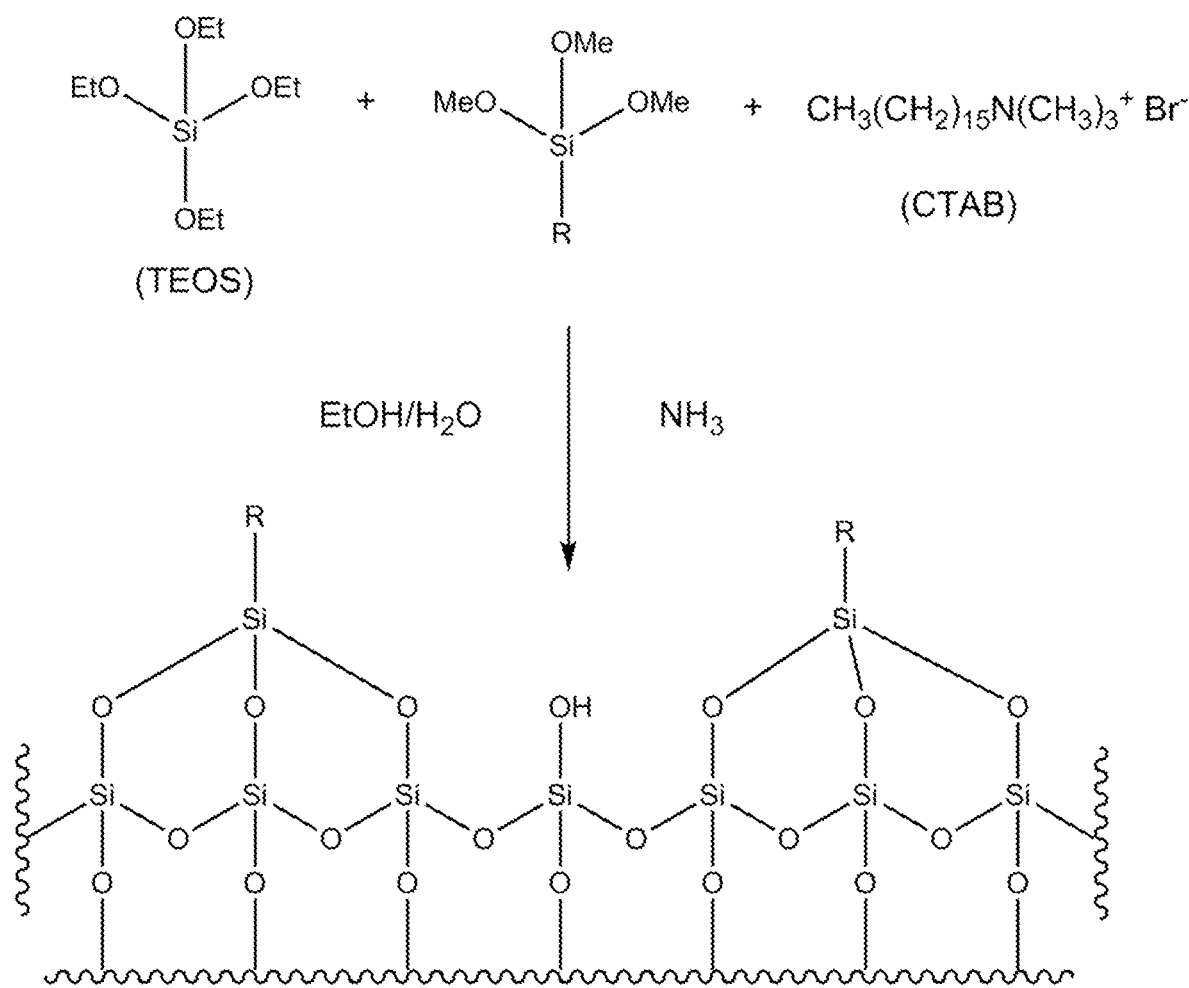
FIG. 3: representation of an embodiment of the synthesis of the functionalized silica gel by means of co-condensation.

One of the preferred embodiments is presented in FIG. 3 and consists in the de novo synthesis of the functionalized silica by means of a co-condensation with tetraethyl orthosilicate (TEOS) and the corresponding alkyltrimethoxysilane in ethanol-water medium, using cetyltrimethylammonium bromide (CTAB) as pore director and ammonia as basic catalyst. The surfactant is removed from the pores after the synthesis by extraction in ethanol-HCl medium.

Figure 4:
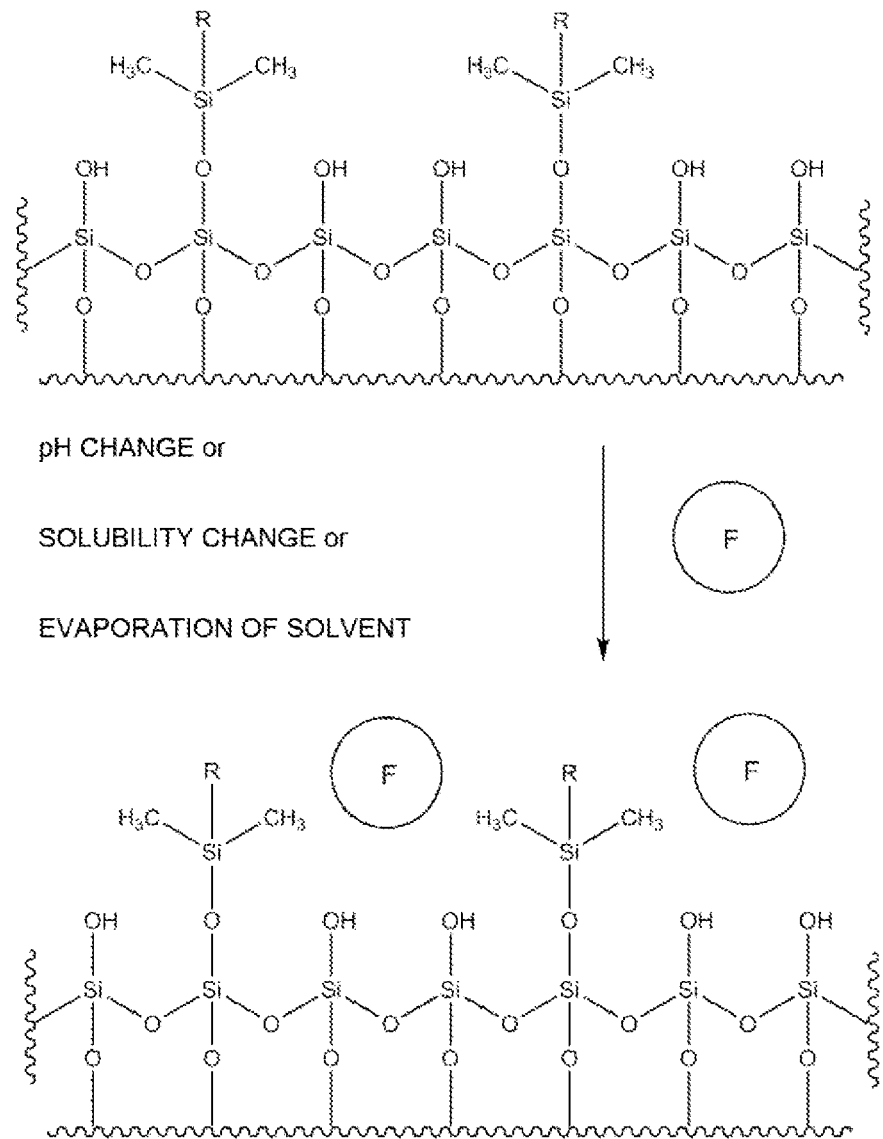
FIG. 4: representation of the different loading approaches of methods of the silica functionalized with fungicides (F).

The second step of the method for preparing the particles of the invention (step b) comprises loading the functionalized silica particles with the fungicidal agent. This loading method may be carried out by three alternative approaches: pH change (step b1), solubility change (step b2) or solvent evaporation (step b3). These three approaches are represented in FIG. 4.

The first of these approaches or methods (step b1) comprises suspending the particles in an aqueous concentrated solution of the fungicide in its ionic, water-soluble form, and varying the pH to progressively bring the fungicide into its non-ionic form. As the fungicide passes into its non-ionic form it becomes hydrophobic and disappears from the water to interact with the hydrocarbon chains of the particles, being retained in the pores thereof, which are progressively loaded until the water is free of fungicide.

In a particular embodiment, the pH of the abovementioned step b1) may comprise:
 i. reducing it by means of acids from the group of the inorganic acids, or from that of the water-miscible organic acids, in both cases monoprotic or polyprotic, strong or weak; or
 ii. increasing it by means of mono- or polyvalent compounds from the group of the hydroxides, mono or polyvalent, from the group of the inorganic base salts, from the group of the water-miscible nitrogenated heterocycles or from the group of the water-miscible organic amines, including ammonia.

In the case of fungicides forming cationic species when protonated, it starts with acid solutions and the pH is increased to be at least 2 points above the pKa. In a preferred embodiment, NaOH is used to increase the pH. In the case of fungicides forming anionic species when deprotonated, it starts with basic solutions and the pH is decreased to be at least 2 points below the pKa. In a preferred embodiment, HCl is used to decrease the pH.

The second approach to carry out the loading (step b2) consists in suspending the particles in a solution of the fungicide, in its non-ionic form, in a water miscible organic solvent and further reducing the solubility of the fungicide in the organic solution by adding water. This forces the fungicide to escape from the solution interacting with the hydrocarbon chains of the particles, thus performing the load. Although it is not intended to be limiting, in a particular embodiment, the water-miscible organic solvent is selected among acetone, acetonitrile, alcohols, preferably methanol, ethanol, propanol, butanol or isopropanol, dimethylsulfoxide, dimethylformamide, dioxane or tetrahydrofurane or a mixture thereof. This loading method is specially preferred when the fungicide does not have an acid-base behavior and do not enable loading by pH change, but it may, however, be applied to all kinds of fungicide.

Finally, a third approach to carry out the loading (step b3) comprises suspending the particles in a solution of the fungicide, in its non-ionic form, in an organic solvent with a low boiling point (such as, for example, dichloromethane, ethyl ether, hexane, ethyl acetate, methanol, acetone, acetonitrile, etc.) with is further evaporated from the mixture under reduced pressure. As the concentration of fungicide increases, the solution is sobresaturated and the fungicide escapes from the same and passes to the pores of the particles, where it favorably interacts with the hydrocarbon chains thereof. When all the solvent is evaporated, the fungicide is retained within the particles. Although it is not intended to be a limitative list, a particular embodiment comprises using as organic solvent with low boiling point one selected among haloalkanes, preferably chloroform and dichloromethane; alkyl ethers, preferably ethyl ether and tetrahydrofuran; short chain alkanes, preferably pentane, hexane and heptane; alkyl alkanoates, preferably ethyl acetate; alcohols, preferably methanol and ethanol; acetone or acetonitrile or mixtures thereof.

The System for the Controlled and Targeted Release of Fungicides

Another essential object of the invention is a system for the controlled and targeted release of fungicides over the sites of infection in plant tissues comprising the particles of the invention suspended in an aqueous buffered solution at a pH in which the fungicidal agent stays in its non-ionic form.

The system for the controlled and targeted release of fungicides of the invention (or the system of the invention), thus, comprises two essential elements: the particles of the invention, which have been widely described above, and the buffered solution.

The buffered solution serves a double function. On the one hand, it serves as carrier for applying the particles on the products to be treated and, on the other hand, has the function of keeping adequate pH conditions to make the fungicidal agent remain in its non-ionized form (lipophilic). In this form, the fungicide is not water-soluble but instead has a high affinity for the hydrocarbon chains. The result is that the fungicide is retained indefinitely within the particles when they are dispersed in water, that is, the system of the invention presents a zero release in water time-independent and controlled by the pH. A simple decantation of the particles leave the water completely free of residues. The partition coefficient particle/water for the fungicide is higher than 99.9%.

For the preparation of the system of the invention, once the particles are loaded with fungicide, the product is formulated as a suspension in buffered water. To this end, the particles are progressively dispersed in water suitably buffered at a pH at which the fungicide remains in its non-ionic form. In the case of basic fungicides, mostly provided with nitrogenated heterocycles capable of being protonated forming water-soluble cationic species (for example, imazalil, pyrimethanil, prochloraz, tiabendazole, tebuconazole, etc.), the pH of the buffer is kept at least 1 point above the pKa of the fungicide, such that it is completely deprotonated and thus in its non-ionic form. In the case of fungicides with phenol or acid groups, capable of being deprotonated to form water-soluble anionic species (such as, for example, orthophenylphenol), the pH of the buffer is kept at least 1 point below the pKa of the fungicide, such that it is completely protonated and thus in its non-ionic form. In the case of fungicides without a noteworthy acid-base behavior (for example, fludioxonil, propiconazole, etc.), the pH of the buffer does not influence its release, since they are always in their neutral form (lipophilic), and therefore, it is taken as a reference in a neutral pH buffer for all of them.

Typically, the concentration of the particles in the suspension is between 1 g/l and 300 g/l, although in a particular embodiment is between 6 g/l and 60 g/l. The suspension may be prepared more concentrated and later diluted to the adequate application concentration for each case or may be prepared directly at the application concentration. The final application concentration for use in each case must be sufficient to provide the required amount of fungicide that would achieve 100% efficiency in control of rotting (recommended dose for each fungicide) and will depend on the amount of fungicide loaded in the particles. The higher the load of fungicide in the particles, the lower the application concentration needed to achieve the recommended dose of fungicide.

With regard to the nature of the buffer solution, any one that maintains the pH of the buffer solution unchangeable is useful in the context of the invention, but in a particular and preferred embodiment the buffer solution is selected from the group of phosphates, phosphonates, carbonates, acetates, formates, ammoniums or citrates.

The system of the invention may be used for any fungicide, independently of its chemical nature. In this sense, in a particular embodiment, the system of the invention is based on particles containing a fungicidal agent selected from the group consisting of o-phenylphenol, benomyl, carbendazim, fuberidazole, tiabendazole, thiophanate, methyl thiophanate, chlozolinate, iprodione, procymidone, vinclozolin, imazalil, oxyconazole, pefurazoate, prochloraz, triflumizole, triforine, pyrifenox, phenarimole, nuarimole, azaconazole, bitertanole, bromuconazole, cyproconazole, difenoconazole, diniconazole, epoxiconazole, fenbuconazole, fluquinconazole, flusilazole, flutriafole, hexaconazole, imibenconazole, ipconazole, metconazole, myclobutanil, penconazole, propiconazole, protioconazole, simeconazole, tebuconazole, tetraconazole, triadimefon, triadimenol, triticonazole, benalaxyl, furalaxyl, metalaxyl, mefenoxam, oxadixyl, ofurace, aldimorf, dodemorf, fenpropimorf, tridemorf, fenpropidine, piperaline, spiroxamine, edifenphos, iprobenphos, pirazophos, isoprothiolane, benodanyl, boscalid, carboxin, fenfuram, flutolanil, furametpir, mepronil, oxycarboxine, pentiopirad, thifluzamide, bupirimate, dimethirimol, ethirimol, cyprodinil, mepanipirim, pyrimethanil, diethofencarb, azoxystrobin, enestrobin, picoxystrobin, pyradostrobin, kresoxim-methyl, trifloxystrobin, dimoxystrobin, metominostrobin, orysastrobin, famoxadone, fluoxastrobin, fenamidone, fenpiclonyl, fludioxonil, quinoxyfen, biphenyl, chloroneb, dichloran, quintozene, tecnazene, tolclophos-methyl, etridiazole, phthalide, pyroquilon, tricyclazole, carpropamide, diclocymet, fenoxanyl, fenhexamid, pyributicarb, naphtiphine, terbinaphine, polyoxyne, pencycurone, cyazofamid, zoxamide, blasticidin S, kasugamycin, streptomycin, validamycin, cymoxanil, iodocarb, propamocarb, prothiocarb, binapacryl, dinocap, ferimzone, fluazinam, fentin acetate, fentin chloride, fentin hydroxide, oxolinic acid, hymexazol, octilinone, fosetyl-Al, phosphorous acid and its salts (for example, potassium phosphite and calcium phosphite), teclophtalam, triazoxide, flusulphamide, diclomezine, silthiofam, diflumetorim, dimetomorf, flumorf, bentiavalicarb, iprovalicarb, mandipropamid, oxytetracycline, methasulfocarb, acibenzolar-S-methil, probenazole, tiadinil, etaboxam, ciflufenamid, proquinazid, metrafenone, fluopicolide, ferbam, mancozeb, maneb, metiram, propineb, tiram, zineb, ziram, captan, captafol, folpet, chlorothalonil, dichlofluanid, tolylfluanid, dodine, guazatine, iminoctadine, anilazine, ditianon, ampropylphos, benzamacryl, betoxazine, buthiobate, chlorosulphamic acid, cycloprate, cyprofuram, diclone, dichlobutrazole, dinoterbon, diphenylamine, dipyrithione, ditalimphos, drazoxolon, etaconazole, phenaminosulf, flumetover, fluoroimide, cis-furconazole, furmeciclox, furofanate, gemtamycin, gliodin, halacrinate, hexachlorophene, korax, dimethyldithiocarbamate, 2-methyl-4-chlorophenoxyacetic acid, mercaptobenzothiazole, metalaxil-M, metfuroxam, metsulfovax, milneb, miclozoline, nitrotal-isopropyl, oxycarboxin, oxythioquinox, phosdiphen, phthalamic acid, polycarbamate, polyoxorim, pyracarbolid, pyridinitryl, pyroxifur, quinacetole, quinconazole, sec-butylamine, sodium dehydroacetate, (2-benzothiazolylthio)methyl thiocyanate, tetraiodoethylene, ticiofen, triclamide, zarilamide, valifenalate, sedaxane, pyriophenone, penflufen, oxatiapiproline, metam, meptyldinocap, mandestrobin, lyserfenvalpir, isopyrazam, osofetamide, fluxapyroxad, flutianil, fluopyram, fenpyrazamine, dazomet, bixafen, benzovindiflupir, benalaxyl-M, amisulbrom, ametoctradin, 8-hydroxiquinoline, methyl 2,5-dichorobenzoate, chloropycrin, sorbic acid and its salts, benzoic acid and its salts, propionic acid and its salts or combinations thereof.

Particularly preferably, the system of the invention comprises, as fungicidal agent, imazalil, tiabendazole, pyrimethanil, cyprodinil, mepanipirim, prochloraz, propiconazole or fludioxonyl and the buffer solution is at a pH equal to or great than 7.5.

The system of the invention is defined as a controlled and targeted release system because it enables achieving an effect of global zero release of fungicide controlled by the pH in the treatment water and on the surface of the treated vegetable tissue (for example, that of vegetable and fruit products) and targeted only to the sites of infection. Also, release is not sustained but complete and immediate in those areas of infection, making the fungicidal action to be highly effective and the possible progression of the infection drastically cut off.

Therefore, when the aqueous buffer suspension with the loaded particles is applied, for example, on the vegetable and fruit products, the particles are deposited on the surface thereof with the fungicide retained inside and the treatment waters are free of fungicide, making the fungicide not transferred to the surface of the product or fruit treated. In this way, the system of the invention presents a practically zero release on the surface and the fruit assimilates only traces of residues. Specifically, the partition coefficient particle/fruit for the fungicide is generally higher than 96%. However, at the same time, some of the particles enter through the natural holes or wounds, which are the most important and usual sites of infection in vegetable tissues, and become trapped inside, leaving all the fungicide available to enter into contact with the fungus from the very moment they enter in such sites of infection, given that the particles of the invention have an open pores system. Also, in the case of basic fungicides, the fungicide effect is even enhanced since the acid pH of the wounds allow their protonation, forming their water-soluble cationic species, which are released from the particles and to the aqueous medium of the wound. The wounds of the vast majority of the vegetable and fruit products show an acid pH due to the presence of natural organic acids, this pH is further lowered because of the progression of the fungal infection (Dov Prusky et al., *Phytopathology* 2004, 94(1), 44-51).

Use of the Particles and of the System for the Controlled and Targeted Release of fungicides Another object of the invention is represented by the use of the particles of the invention or of the system for the controlled and targeted release of fungicides of the invention for a fungicidal treatment targeted to sites of infection of vegetable tissues.

The use of the particles and of the system of the invention is intended for the treatment of any vegetable tissue amenable to an infection of fungal or even bacterial origin. However, particularly and preferably, said vegetable tissues are of vegetable and fruit products, preferably fruits from the citrus group, fruits with pits, fruits with small seeds, bananas and tropical fruits, melons and cucurbits, nightshades, tubers, bulbs and berries.

The particles of the invention should be applied for the fungicidal treatment by dispersion in an aqueous solution buffered at a pH in which the fungicidal agent stays in its non-ionic form. With regard to the nature of the buffer solution, any one that maintains the pH of the buffer solution unchangeable is useful in the context of the invention, but in a particular and preferred embodiment the buffer solution is selected from the group of phosphates, phosphonates, carbonates, acetates, formates, ammoniums or citrates. The particles are applied as a buffered aqueous suspension at the adequate use concentration depending on the dose of fungicide recommended and on the amount of fungicide loaded in the particles.

The particles dispersed in the buffer solution or what it is the same, the aforementioned system of the invention, may be used in the fungicide treatment by any method that allows a homogeneous application and an even deposition of the particles on the surface of the product to be treated. In this sense, the preferred embodiment of the invention, as it is the one which best guarantees such uniformity of deposition of the particles on the product consists in the immersion of the vegetable and fruit product to be treated in the system of the invention at a suitable concentration. However, any other application means allowing a homogeneous application of the buffered solution containing the particles of the invention, such as irrigation, showering, spraying, nebulization or fumigation are also considered as part of the invention.

Method for the Treatment of Vegetable and Fruit Products and for the Recovery of the Particles A last object of the invention represents a particular aspect of the general use described above.

Specifically, the last object of the invention is a method to prevent rotting caused by fungus in fruit and vegetable products without generating free fungicide residues in treatment and washing water, and reducing the fungicide residue on fruit to trace level, which comprises:

a) treating the fruit and vegetable product by showering, misting, spraying, fumigating or immersing in system for the controlled and targeted release of fungicides of the invention,
b) removing the excess particles from the surface of the fruit and vegetable products by means of brushing, compressed air, washing with water or with and aqueous solution, or any combination of the foregoing.

The step a) has the purpose of evenly distributing the particles of the invention over the surface of the treated vegetable and fruit product, being in turn deposited in the sites of infection, where the fungicide will be later released. In principle, all the means mentioned for the treatment of the vegetable and fruit product are valid for providing a homogeneous distribution of the particles over the fruit and an adequate deposition on the sites of infection, although the preferred embodiment contemplates the immersion or showering of the product on a solution of the system of the invention.

The step b) has the purpose of eliminating the excess particles present on the surface of the products. Since the eliminated particles remain charged as their load has not been released, by the method of the invention, the level of fungicide in the fruit is reduce to trace level, that is, to residues lower than 0.1 mg/Kg.

On the other hand, the excess particles eliminated may be recovered in a later step and be re-used for a new treatment.

The particles may be recovered by any suitable method, such as, for example, aspiration or gravity. However, the preferred embodiment of the invention comprises that the elimination of the excess particles in step b) is carried out by washing with water or with an aqueous solution, and the recovery of the silica particles still charged with fungicide is carried out by decantation and/or filtration of the washing water.

The method of the invention may be applied over any kind of vegetable product or tissue amenable to rotting because of fungi, however, the method is specially suitable and is specially designed for the treatment of vegetable and fruit products and preferably for the treatment of vegetable and fruit products selected among fruits of the group of citrus, fruits with pits, fruits with small seeds, bananas and tropical fruits, melons and cucurbits, nightshades, tubers, bulbs and berries.

The method of the present invention, as demonstrated in the examples below, avoids the rotting caused by fungi in a manner comparable to conventional treatments. However, it presents a series of evident advantages compared to conventional fungicide treatments.

The first and most important is that it is a clean treatment method. On the one hand, it does not leave free fungicide residues in the treatment or washing water, which makes the method less contaminating for the environment and safer for the operators carrying out the fungicide treatment. On the other hand, it lowers considerably, up to trace level, the fungicide residues in the treated products, which guarantees a safer and healthier product for the final consumer, thus improving the feeling of food safety of said consumer.

Another additional advantage of the method of the present invention is that it allows removing the excess particles that remain loaded with fungicide and the recovery thereof to be re-used in a further treatment.

In short, the method of the invention allows recycling the particles and minimizes the risks for the environment and for the health of the operators and final consumers caused by the presence of free fungicide in the treatment or washing water and of residues on the fruit.

EXAMPLES

The way by which the particles of the invention may be prepared as well as the system for the controlled and targeted release of the invention are illustrated below by means of some examples. The results obtained by its application are also illustrated. These examples are presented as a demonstration but in no way are intended to be limiting of the invention.

Example 1: Preparation of Mesoporous Silica Gel Particles with Octadecyl Moieties and Free Silanol Moieties, SG-C18-OH 356.21 g of mesoporous silica gel particles (230-400 mesh, particle size of 40-63 µm, pre size of 5.5-6 nm) previously dried for 1 hr. at 160° C. and reduced pressure (40 mbar) were suspended under stirring in anhydrous conditions in 1.2 l of dry toluene. After 15 minutes, when the suspension was already homogeneous, 142 ml of dry triethylamine were added and the mixture was stirred under anhydrous conditions for 10 further minutes. Next, 107.17 g of ocatecyldimethylchlorosilane were slowly added (previously melted in the stove, Fp=28-30° C.), under constant stirring. Once the addition was finished, the resulting mixture was stirred for 1 h. After this time, the mixture was vacuum filtered and the resulting solid was washed 3 times with 400 ml of toluene and later 3 times with 400 of MeOH. It was vacuum dried and later in the stove at 110° C., until constant weight, obtaining the product SG-C18-OH as a fine white solid (438.8 g, 86% yield). Elemental analysis: 14.5% C.

Figure 5:
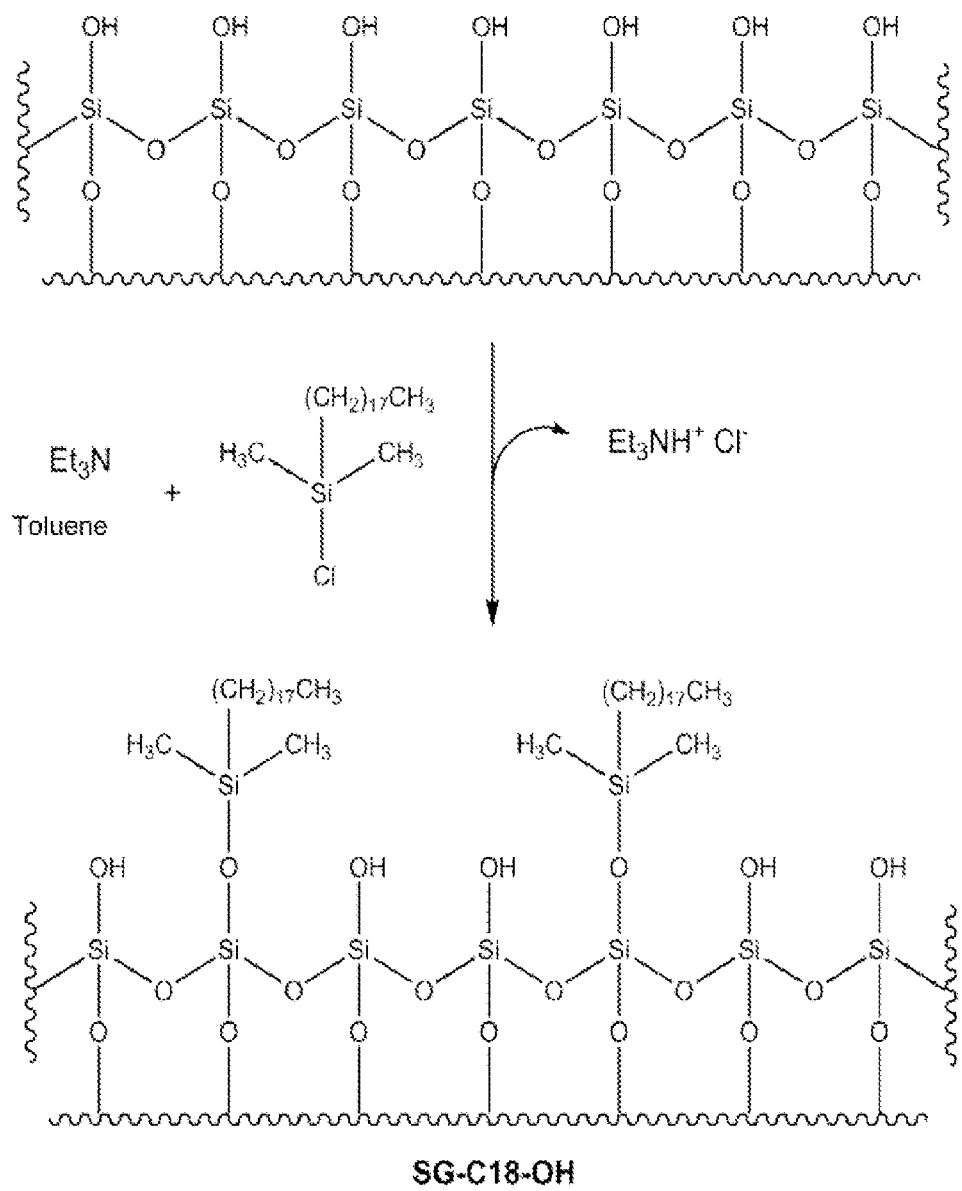
FIG. 5: representation of the synthesis of SG-C18-OH.

The scheme for the preparation of SG-C18-OH is represented in FIG. 5.

Example 2: Preparation of Mesoporous Silica Gel Particles with Dodecyl Moieties and Free Silanol Moieties, SG-C12-OH 358.20 g of mesoporous silica gel particles (230-400 mesh, particle size of 40-63 µm, pre size of 5.5-6 nm) previously dried for 1 hr. at 160° C. and reduced pressure (40 mbar) were suspended under stirring in anhydrous conditions in 1.2 l of dry toluene. After 15 minutes, when the suspension was already homogeneous, 143 ml of dry triethylamine were added and the mixture was stirred under anhydrous conditions for 10 further minutes. Next, 104.12 g of dodecyldimethylchlorosilane were slowly added, under constant stirring. Once the addition was finished, the resulting mixture was stirred for 1 h. After this time, the mixture was vacuum filtered and the resulting solid was washed 3 times with 400 ml of toluene and later 3 times with 400 of MeOH. It was vacuum dried and later in the stove at 110° C., until constant weight, obtaining the product SG-C12-OH as a fine white solid (437.0 g, 88% yield). Elemental analysis: 13.3% C.

Figure 6:
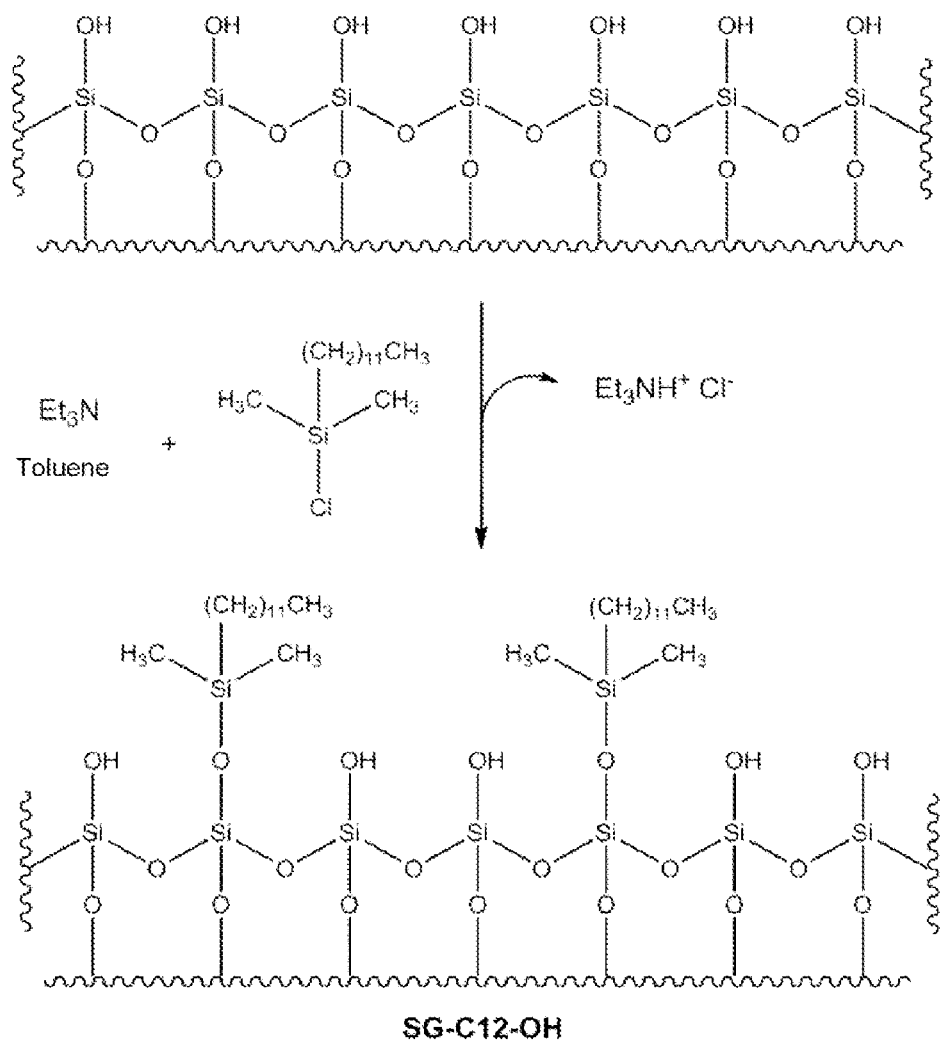
FIG. 6: representation of the synthesis of SG-C12-OH.

The scheme for the preparation of SG-C12-OH is represented in FIG. 6.

Example 3: Loading of the Microparticles SG-C18-OH with Imazalil (IMZ). Obtaining of (IMZ)SG-C18-OH 47.39 g of imazalil sulfate were dissolved in 7.3 l of softened water under gentle stirring. The pH of the solution was 2.02. Next, 438.8 g of SG-C18-OH were added in 4 109.7 g portions, each portion was added slowly and once added mixing was kept for a minimum of 5 minutes of stirring before adding the next portion. Once all SG-C18-OH was added, the resulting mixture was kept under stirring for 30 additional minutes, in order to obtain a homogeneous suspension. After this time, 10.4 ml of aq. 50% NaOH were added dropwise under stirring. Once addition was finished, the pH rose to 10. Stirring was kept for 10 minutes at pH=10. After this time, the suspension was vacuum filtered and the solid obtained was first vacuum dried and later in the stove at 110° C., until constant weight, obtaining the product (IMZ)SG-C18-OH as a fine white solid (474.43 g, 100% yield). Load: 7.5% imazalil (HPLC analysis after forced release, example 6).

Figure 7:
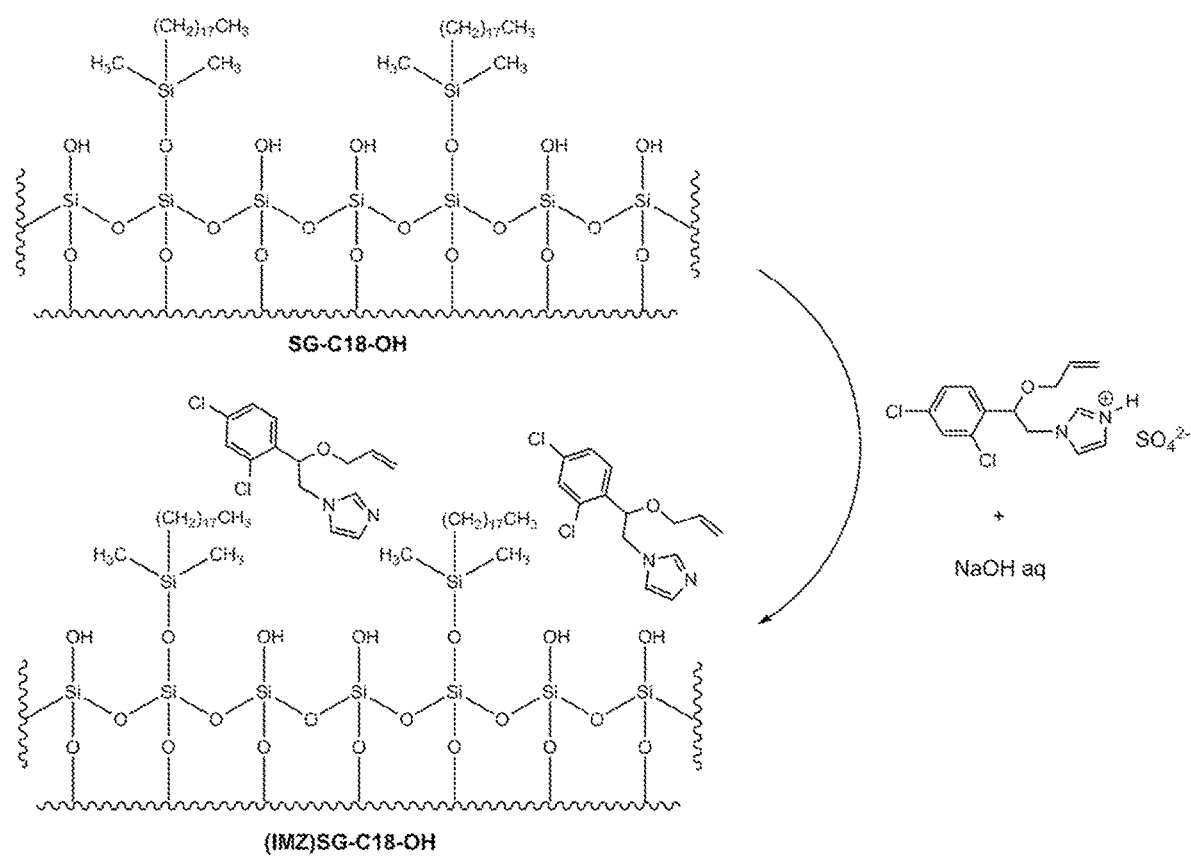
FIG. 7: representation of the load of SG-C18-OH with imazalil (IMZ).

The loading scheme for SG-C18-OH with imazalil is represented in FIG. 7.

Example 4: Loading of the Microparticles SG-C12-OH with Imazalil (IMZ). Obtaining of (IMZ)SG-C12-OH 47.20 g of imazalil sulfate were dissolved in 7.3 l of softened water under gentle stirring. The pH of the solution was 2.01. Next, 437.0 g of SG-C12-OH were added in 4 109.25 g portions, each portion was added slowly and once added mixing was kept for a minimum of 5 minutes of stirring before adding the next portion. Once all SG-C12-

OH was added, the resulting mixture was kept under stirring for 30 additional minutes, in order to obtain a homogeneous suspension. After this time, 10.4 ml of aq. 50% NaOH were added dropwise under stirring. Once addition was finished, the pH rose to 10. Stirring was kept for 10 minutes at pH=10. After this time, the suspension was vacuum filtered and the solid obtained was first vacuum dried and later in the stove at 110° C., until constant weight, obtaining the product (IMZ)SG-C12-OH as a fine white solid (472.48 g, 100% yield). Load: 7.5% imazalil (HPLC analysis after forced release, example 6).

Figure 8:
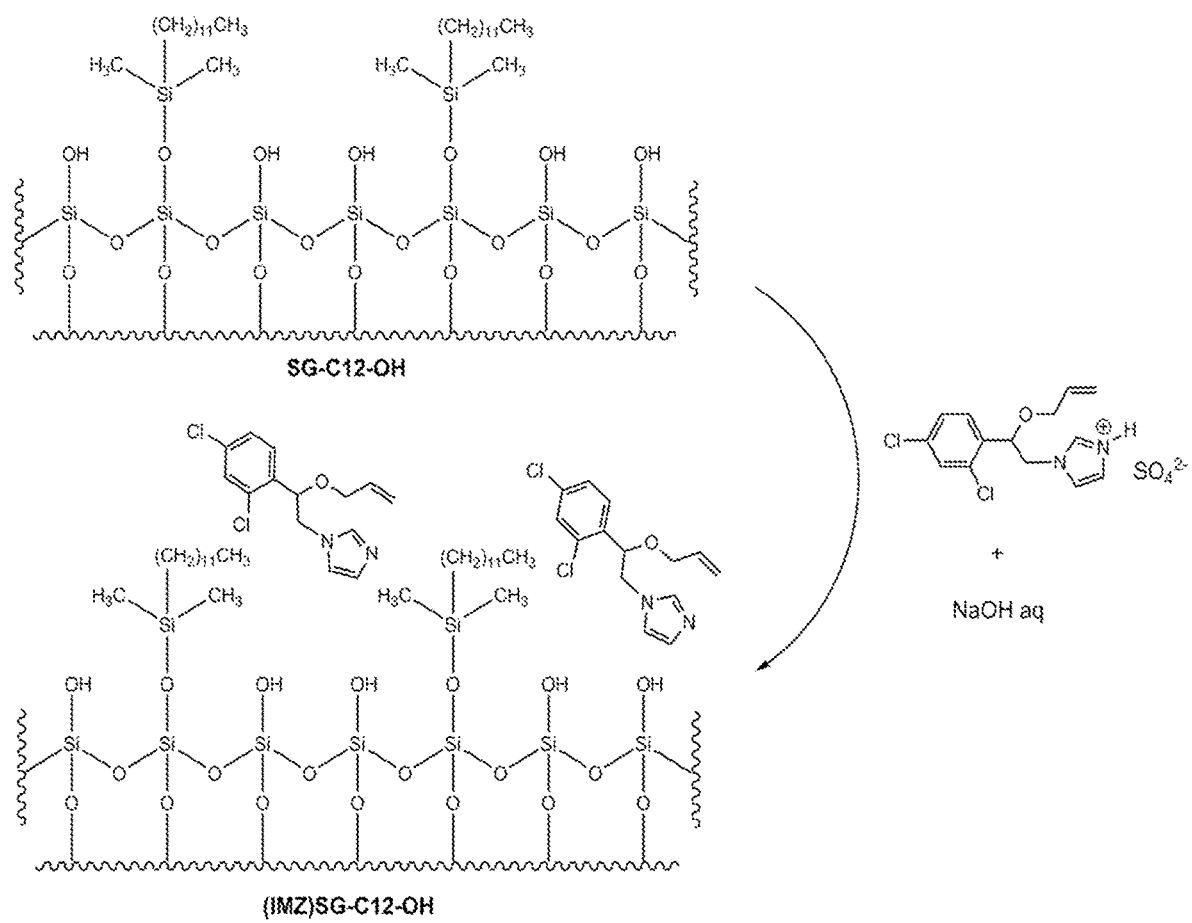
FIG. 8: representation of the load of SG-C12-OH with imazalil (IMZ).

The loading scheme for SG-C12-OH with imazalil is represented in FIG. 8.

Example 5: Analysis of Free Imazalil in Water by HPLC 1 ml of test solution of loaded microparticles was filtered through a nylon 0.45 micron syringe filter and later analyzed by HPLC (Agilent 1100 Series).
Chromatographic Conditions:
Eluent: 40% Acetonitrile
60% Phosphate buffer pH=2.5, 2 mM
Column: ZORBAX SB-C18, 5 μm, 4.6×250 mm, T=25° C.
Detection: DAD (205 nm)
Retention time: 4.9 min Example 6: Analysis of Virtual Imazalil Contained within the Microparticles by Dilution and Forced Release 0.4 ml of the test solution of loaded microparticles were diluted in 20 ml of distilled water at pH=2 (0.01 M in HCl) and the mixture was stirred for 30 minutes. The pH was kept to 2 by adding dropwise, if necessary, HCl 1M. Afterwards, the sample was filtered through a nylon 0.45 micron syringe filter and next analyzed by HPLC, using the same chromatographic conditions as for the example 5.

Example 7: Formulation of the Microparticles (IMZ)SG-C18-OH as a Concentrated Buffered Suspension 60 g of the microparticles (IMZ)SG-C18-OH were added to 0.9 l of softened water buffered with sodium phosphate 10 mM (or sodium etidronate) at pH=7.5 (pKa imazalil=6.49). The addition was carried out slowly in 4 portions of 15 g, keeping the mixture under stirring for 5 min after the addition of each portion. After completely adding the microparticles, the mixture was kept under stirring for 30 min, in order to obtain a homogeneous suspension. Finally, the suspension was brought to 1 l with buffered water to achieve a final concentration of 60 g/l.

Example 8: Formulation of the Microparticles (IMZ)SG-C12-OH as a Concentrated Buffered Suspension 60 g of the microparticles (IMZ)SG-C12-OH were added to 0.9 l of softened water buffered with sodium phosphate 10 mM (or sodium etidronate) at pH=7.5 (pKa imazalil=6.49). The addition was carried out slowly in 4 portions of 15 g, keeping the mixture under stirring for 5 min after the addition of each portion. After completely adding the microparticles, the mixture was kept under stirring for 30 min, in order to obtain a homogeneous suspension. Finally, the suspension was brought to 1 l with buffered water to achieve a final concentration of 60 g/l.

Examples 9-14: Comparative Examples with Conventional Treatment (Reference) Against a Targeted Release (LD) Treatment Using Micropartiles of the (IMZ)SG-C18-OH and (IMZ)SG-C12-OH Type Without previous washing or treatment, fruits from the same batch, receive from field, were randomized in groups of 25. Each treatment was performed with 4 replicates of 25 fruits, which were artificially inoculated on one side by pricking with a punch (2 mm length, 1 mm diameter) previously impregnated in a solution of *Penicillium digitatum* or *Penicillium italicum* spores of $5*10^5$ cfu/ml and allowed to stand for 17 hours before treatment.

For the reference conventional treatment (IMZ REF) a solution of imazalil sulfate at 450 mg/l in tap water was prepared from a commercial solution at 7.5% (CITROSOL 7.5 LS). For the LD treatments, IMZ LD C18 and IMZ LD C12, suspensions of (IMZ)SG-C18-OH and (IMZ)SG-C12-OH at 6 g/l in tap water buffered with 10 mM of sodium etidronate at pH=7.5 was prepared from the concentrated suspensions described in examples 7 and 8. A 6 g/l suspension correspond to a virtual imazalil concentration contained within the microparticles of 450 mg/l. As a control, a treatment of bathing in tap water was carried out (CONTROL).

The 25 fruits of each replicate were bathed using a mesh by immersion for 30 seconds in 10 l of treatment. After bathing, the fruits were left to dry at room temperature for 2 hours and later stored for 24 h at 9° C. and 85% relative humidity (RH), mimicking industrial storage conditions. Next, all the fruits were washed in a commercial washing machine for citrus (Matyc, Gandia, Spain), simulating the step before waxing in the manufacture of citrus. In said washing machine, along 18 rotatory brushes, a sequence of prewash with tap water (showers, 28 LIT), followed by soaping with 0.04% sodium dodecylbenzenesulphonate (droopers, 5.7 LIT) and finally rinsing with tap water (showers, 28 UT) was carried out. In the first prewash step of the LD treatments the remaining product was recovered and isolated from the poured water by decantation for reutilization, these becoming free of fungicide residues. Once dry, the fruits were stored at 22° C. and 85% RH for 7 days, simulating the commercial shelf life (CSL). After this time, the number of rotten fruits were counted for each replicate. The effectiveness of the treatments is expressed as % rotting and also as rotting reduction index (RRI, %), which is calculated as: 100×(No. of rotten control fruits−No. of rotten products in the treatment)/No. of rotten fruits in the control.

In the moment of treatment, the concentration of free imazalil in waters and the concentration of virtual imazalil contained in the microparticles were analyzed, according to the methods described in examples 5 and 6. At the end of the experiment, after the 7 days of CSL, the imazalil residue in the fruits was analyzed at a certified laboratory (LTL, Paterna, Spain). The reduction of free fungicide in water is calculated as: 100×(concentration of free fungicide in reference treatment water−concentration of free fungicide in LD treatment water)/concentration of free fungicide in reference treatment water. Likewise, the reduction of fungicide residues in fruits is calculated as: 100×(fungicide residues in fruit in reference treatment−fungicide residues in fruit in LD treatment)/fungicide residues in fruit in reference treatment.

In all the cases, the values of reduction of imazalil (IMZ) residues provided by the LD treatments were >95% in fruit and >99.9% in water and the efficiency thereof for controlling the rotting (RRI) equivalent to that obtained with the conventional treatment (reference).

Example 9. Oranges of Valencia Variety Inoculated with *P. digitatum*

Figure 9:
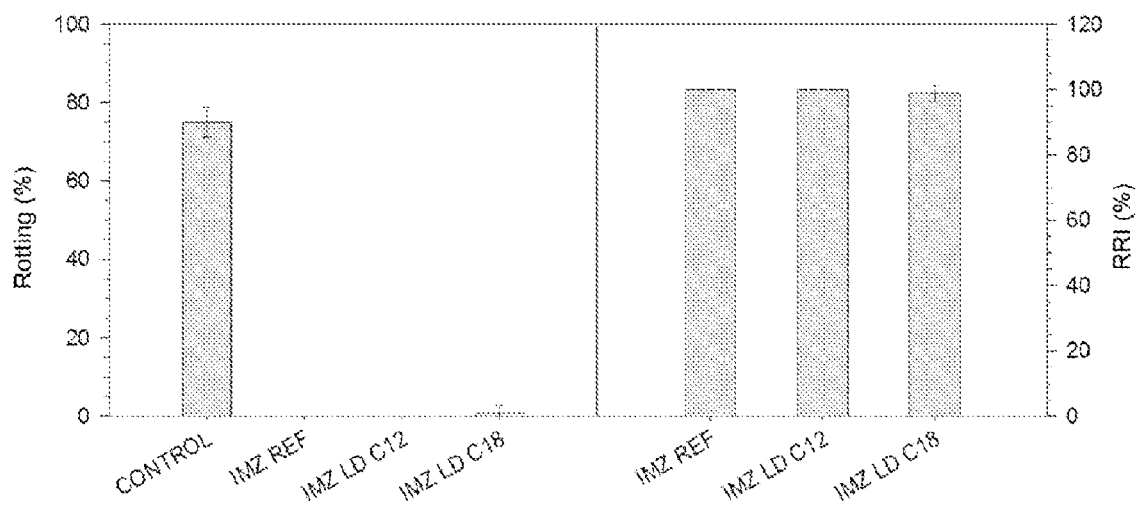
FIG. 9: Rotting (%) and rotting reduction index (%), DRI, in oranges of the Valencia variety inoculated with *P. digitatum* after 7 days at RH 85% and 22° C. treated with 6 g/l of (IMZ)SG-C18-OH or (IMZ)SG-C12-OH in etidronic buffer 10 mM, pH=7.5 (IMZ LD C18 and IMZ LD C12, respectively), with an aqueous solution of imazalil sulfate at 450 mg/l (IMZ REF) or with tap water (CONTROL).

As shown in FIG. 9 the treatments with (IMZ)SG-C18-OH and (IMZ)SG-C12-OH provide a decrease in the rotting percentage equivalent to that of the reference treatment with imazalil, with RRIs dose to 100%. These results demonstrate that the treatment with (IMZ)SG-C18-OH and the treatment with (IMZ)SG-C12-OH has an efficiency equivalent to that of the reference treatment with imazalil in controlling the rotting of oranges of the Valencia variety inoculated with *P. digitatum*.

Also, the results in table 1 demonstrate that, in addition to having a high efficacy, the LD treatments with (IMZ)SG-C18-OH and (IMZ)SG-C12-OH present imazalil concentrations in treatment water and residues on fruit considerably lower to those observed with the reference treatment with imazalil, reaching almost undetectable levels in water (with up to 4 fold reductions) and trace levels in fruit (with reductions close to 2 fold).

TABLE 1

Reduction of IMZ residues and of [IMZ] in treatment water for example 9. Oranges of Valencia variety inoculated with *P. digitatum* and stored 7 days at 22° C. and 85% RH.

|  | Dose (mg/l) | IMZ residue in fruit (mg/Kg) | Reduction of residues in fruit (%) | [IMZ] free in water (mg/l) | Reduction of [IMZ] in water (%) |
|---|---|---|---|---|---|
| IMZ REF | 450 | 1.60 | 0.0 | 450 | 0.0 |
| IMZ LD C12 | 513 (*) | 0.029 | 98.2 | <0.02 | >99.99 |
| IMZ LD C18 | 505 (*) | 0.047 | 97.1 | <0.02 | >99.99 |

(*) Virtual concentration of imazalil contained in the microparticles, analyzed after the forced release according to example 6.

Therefore, the treatments with (IMZ)SG-C18-OH and (IMZ)SG-C12-OH are an alternative and advantageous solution to the treatment with reference imazalil since they have the same efficacy in preventing rotting, but present a considerable decrease in the intake of imazalil residues by the consumer and the possible environmental pollution by the much higher concentration in treatment and washing water of the current reference treatment.

Example 10. Oranges of Navel Variety Inoculated with *P. digitatum*

Figure 10:
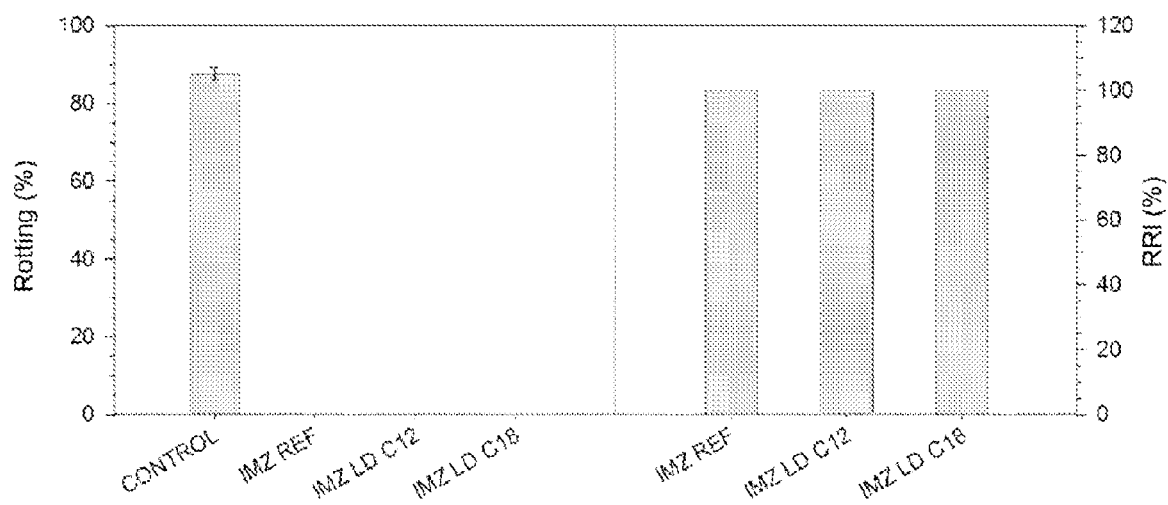
FIG. 10: Rotting (%) and rotting reduction index (%), DRI, in oranges of the Navel variety inoculated with *P. digitatum* after 7 days at RH 85% and 22° C. treated with 6 g/l of (IMZ)SG-C18-OH or (IMZ)SG-C12-OH in etidronic buffer 10 mM, pH=7.5 (IMZ LD C18 and IMZ LD C12, respectively), with an aqueous solution of imazalil sulfate at 450 mg/l (IMZ REF) or with tap water (CONTROL).

As shown in FIG. 10 the treatments with (IMZ)SG-C18-OH and (IMZ)SG-C12-OH provide a decrease in the rotting percentage equivalent to that of the reference treatment with imazalil, with RRIs of 100%. These results demonstrate that the treatment with (IMZ)SG-C18-OH and the treatment with (IMZ)SG-C12-OH has an efficiency equivalent to that of the reference treatment with imazalil in controlling the rotting of oranges of the Navel variety inoculated with *P. digitatum*.

Also, the results in table 2 demonstrate that, in addition to having a high efficacy, the LD treatments with (IMZ)SG-C18-OH and (IMZ)SG-C12-OH present imazalil concentrations in treatment water and residues on fruit considerably lower to those observed with the reference treatment with imazalil, reaching almost undetectable levels in water (with up to 4 fold reductions) and trace levels in fruit (with reductions close to 2 fold).

TABLE 2

Reduction of IMZ residues and of [IMZ] in treatment water for example 10. Oranges of Navel variety inoculated with *P. digitatum* and stored 7 days at 22° C. and 85% RH.

|  | Dose (mg/l) | IMZ residue in fruit (mg/Kg) | Reduction of residues in fruit (%) | [IMZ] free in water (mg/l) | Reduction of [IMZ] in water (%) |
|---|---|---|---|---|---|
| IMZ REF | 450 | 1.10 | 0.0 | 450 | 0.0 |
| IMZ LD C12 | 443 (*) | 0.026 | 97.6 | 0.046 | 99.99 |
| IMZ LD C18 | 452 (*) | 0.023 | 97.9 | 0.21 | 99.95 |

(*) Virtual concentration of imazalil contained in the microparticles, analyzed after the forced release according to example 6.

Therefore, the treatments with (IMZ)SG-C18-OH and (IMZ)SG-C12-OH are an alternative and advantageous solution to the treatment with reference imazalil since they have the same efficacy in preventing rotting, but present a considerable decrease in the intake of imazalil residues by the consumer and the possible environmental pollution by the much higher concentration in treatment and washing water of the current reference treatment.

Example 11. Lemons of Prima Fiori Variety Inoculated with *P. digitatum*

As shown in FIG. 11 the treatments with (IMZ)SG-C18-OH and (IMZ)SG-C12-OH provide a decrease in the rotting percentage equivalent to that of the reference treatment with imazalil, with RRIs close to 100%. These results demonstrate that the treatment with (IMZ)SG-C18-OH and the treatment with (IMZ)SG-C12-OH has an efficiency equivalent to that of the reference treatment with imazalil in controlling the rotting of lemons of the Prima Fiori variety inoculated with *P. digitatum*.

Also, the results in table 3 demonstrate that, in addition to having a high efficacy, the LD treatments with (IMZ)SG-C18-OH and (IMZ)SG-C12-OH present imazalil concentrations in treatment water and residues on fruit considerably lower to those observed with the reference treatment with imazalil, reaching almost undetectable levels in water (with up to 4 fold reductions) and trace levels in fruit (with reductions close to 2 fold).

TABLE 3

Reduction of IMZ residues and of [IMZ] in treatment water for example 11. Lemons of Prima Fiori variety inoculated with *P. digitatum* and stored 7 days at 22° C. and 85% RH.

|  | Dose (mg/l) | IMZ residue in fruit (mg/Kg) | Reduction of residues in fruit (%) | [IMZ] free in water (mg/l) | Reduction of [IMZ] in water (%) |
|---|---|---|---|---|---|
| IMZ REF | 450 | 3.30 | 0.0 | 450 | 0.0 |
| IMZ LD C12 | 452 (*) | 0.120 | 96.4 | 0.048 | 99.99 |
| IMZ LD C18 | 457 (*) | 0.052 | 98.4 | <0.02 | >99.99 |

(*) Virtual concentration of imazalil contained in the microparticles, analyzed after the forced release according to example 6.

Therefore, the treatments with (IMZ)SG-C18-OH and (IMZ)SG-C12-OH are an alternative and advantageous solution to the treatment with reference imazalil since they have the same efficacy in preventing rotting, but present a considerable decrease in the intake of imazalil residues by the consumer and the possible environmental pollution by the much higher concentration in treatment and washing water of the current reference treatment.

Example 12. Tangerines of Nadorcott Variety Inoculated with *P. digitatum*

As shown in FIG. 12 the treatments with (IMZ)SG-C18-OH and (IMZ)SG-C12-OH provide a decrease in the rotting percentage equivalent to that of the reference treatment with imazalil, with RRIs of 100%. These results demonstrate that the treatment with (IMZ)SG-C18-OH and the treatment with (IMZ)SG-C12-OH has an efficiency equivalent to that of the reference treatment with imazalil in controlling the rotting of tangerines of the Nadorcott variety inoculated with *P. digitatum*.

Also, the results in table 4 demonstrate that, in addition to having a high efficacy, the LD treatments with (IMZ)SG-C18-OH and (IMZ)SG-C12-OH present imazalil concentrations in treatment water and residues on fruit considerably lower to those observed with the reference treatment with imazalil, reaching almost undetectable levels in water (with up to 4 fold reductions) and trace levels in fruit (with reductions close to 2 fold).

TABLE 4

Reduction of IMZ residues and of [IMZ] in treatment water for example 12. Tangerines of Nadorcott variety inoculated with *P. digitatum* and stored 7 days at 22° C. and 85% RH.

|  | Dose (mg/l) | IMZ residue in fruit (mg/Kg) | Reduction of residues in fruit (%) | [IMZ] free in water (mg/l) | Reduction of [IMZ] in water (%) |
|---|---|---|---|---|---|
| IMZ REF | 450 | 1.70 | 0.0 | 450 | 0.0 |
| IMZ LD C12 | 475 (*) | 0.020 | 98.8 | 0.084 | 99.98 |
| IMZ LD C18 | 465 (*) | 0.019 | 98.9 | <0.02 | >99.99 |

(*) Virtual concentration of imazalil contained in the microparticles, analyzed after the forced release according to example 6.

Therefore, the treatments with (IMZ)SG-C18-OH and (IMZ)SG-C12-OH are an alternative and advantageous solution to the treatment with reference imazalil since they have the same efficacy in preventing rotting, but present a considerable decrease in the intake of imazalil residues by the consumer and the possible environmental pollution by the much higher concentration in treatment and washing water of the current reference treatment.

Example 13. Grapefruits of Star Ruby Variety Inoculated with *P. digitatum*

As shown in FIG. 13 the treatments with (IMZ)SG-C18-OH and (IMZ)SG-C12-OH provide a decrease in the rotting percentage equivalent to that of the reference treatment with imazalil, with RRIs of 100%. These results demonstrate that the treatment with (IMZ)SG-C18-OH and the treatment with (IMZ)SG-C12-OH has an efficiency equivalent to that of the reference treatment with imazalil in controlling the rotting of grapefruits of the Star Ruby variety inoculated with *P. digitatum*.

Also, the results in table 5 demonstrate that, in addition to having a high efficacy, the LD treatments with (IMZ)SG-C18-OH and (IMZ)SG-C12-OH present imazalil concentrations in treatment water and residues on fruit considerably lower to those observed with the reference treatment with imazalil, reaching almost undetectable levels in water (with up to 4 fold reductions) and trace levels in fruit (with reductions close to 2 fold).

TABLE 5

Reduction of IMZ residues and of [IMZ] in treatment water for example 13. Grapefruits of Star Ruby variety inoculated with *P. digitatum* and stored 7 days at 22° C. and 85% RH.

|  | Dose (mg/l) | IMZ residue in fruit (mg/Kg) | Reduction of residues in fruit (%) | [IMZ] free in water (mg/l) | Reduction of [IMZ] in water (%) |
|---|---|---|---|---|---|
| IMZ REF | 450 | 1.30 | 0.0 | 450 | 0.0 |
| IMZ LD C12 | 467 (*) | 0.020 | 98.5 | <0.02 | >99.99 |
| IMZ LD C18 | 484 (*) | 0.027 | 97.9 | <0.02 | >99.99 |

(*) Virtual concentration of imazalil contained in the microparticles, analyzed after the forced release according to example 6.

Therefore, the treatments with (IMZ)SG-C18-OH and (IMZ)SG-C12-OH are an alternative and advantageous solution to the treatment with reference imazalil since they have the same efficacy in preventing rotting, but present a considerable decrease in the intake of imazalil residues by the consumer and the possible environmental pollution by the much higher concentration in treatment and washing water of the current reference treatment.

Example 14. Oranges of Valencia Variety Inoculated with *P. italicum*

As shown in FIG. 14 the treatments with (IMZ)SG-C18-OH and (IMZ)SG-C12-OH provide a decrease in the rotting percentage equivalent to that of the reference treatment with imazalil, with RRIs close to 100%. These results demonstrate that the treatment with (IMZ)SG-C18-OH and the treatment with (IMZ)SG-C12-OH has an efficiency equivalent to that of the reference treatment with imazalil in controlling the rotting of oranges of the Valencia variety inoculated with *P. italicum*.

Also, the results in table 6 demonstrate that, in addition to having a high efficacy, the LD treatments with (IMZ)SG-C18-OH and (IMZ)SG-C12-OH present imazalil concentrations in treatment water and residues on fruit considerably lower to those observed with the reference treatment with imazalil, reaching almost undetectable levels in water (with up to 4 fold reductions) and trace levels in fruit (with reductions close to 2 fold).

TABLE 6

Reduction of IMZ residues and of [IMZ] in treatment water for example 14. Oranges of Valencia variety inoculated with *P. italicum* and stored 7 days at 22° C. and 85% RH.

|  | Dose (mg/l) | IMZ residue in fruit (mg/Kg) | Reduction of residues in fruit (%) | [IMZ] free in water (mg/l) | Reduction of [IMZ] in water (%) |
|---|---|---|---|---|---|
| IMZ REF | 450 | 2.40 | 0.0 | 450 | 0.0 |
| IMZ LD C12 | 460 (*) | 0.037 | 98.5 | 0.026 | 99.99 |

TABLE 6-continued

Reduction of IMZ residues and of [IMZ] in treatment water for example 14. Oranges of Valencia variety inoculated with *P. italicum* and stored 7 days at 22° C. and 85% RH.

|  | Dose (mg/l) | IMZ residue in fruit (mg/Kg) | Reduction of residues in fruit (%) | [IMZ] free in water (mg/l) | Reduction of [IMZ] in water (%) |
|---|---|---|---|---|---|
| IMZ LD C18 | 451 (*) | 0.033 | 98.6 | <0.02 | >99.99 |

(*) Virtual concentration of imazalil contained in the microparticles, analyzed after the forced release according to example 6.

Therefore, the treatments with (IMZ)SG-C18-OH and (IMZ)SG-C12-OH are an alternative and advantageous solution to the treatment with reference imazalil since they have the same efficacy in preventing rotting, but present a considerable decrease in the intake of imazalil residues by the consumer and the possible environmental pollution by the much higher concentration in treatment and washing water of the current reference treatment.

Example 16: Loading of the Microparticles SG-C18-OH with Pyrimethanil (PIR). Obtaining of (PIR)SG-C18-OH 5.25 g of pyrimethanil were dissolved in 2 l of softened water 0.01 M in HCl (pH=2) using vigorous stirring. The mixture was kept at pH=2 by dropwise adding HCl, if necessary, until obtaining the total dissolution of the fungicide. Next, 134.75 g of SG-C18-OH were added in 4 33.7 g portions, each portion was added slowly and once added mixing was kept for a minimum of 5 min of stirring before adding the next portion. Once all SG-C18-OH was added, the resulting mixture was kept under stirring for 30 additional minutes, in order to obtain a homogeneous suspension. After this time, 50% NaOH was added dropwise under stirring until reaching pH=10. Stirring was kept for 10 min at pH=10. After this time, the suspension was vacuum filtered and the solid obtained was first vacuum dried and later in the stove at 110° C., until constant weight, obtaining the product (PIR)SG-C18-OH as a fine white solid (140.0 g, 100% yield). Load: 3.75% pyrimethanil (Analysis: HPLC after forced release, example 19).

The loading scheme for SG-C18-OH with pyrimethanil is represented in FIG. 15.

Example 16: Formulation of the Microparticles (PIR)SG-C18-OH as a Concentrated Buffered Suspension 140 g of the microparticles (PIR)SG-C18-OH were added to 0.9 l of softened water buffered with sodium phosphate 10 mM (or sodium etidronate) at pH=7.5 (pKa pyrimethanil=3.50). The addition was carried out slowly in 4 portions of 35 g, keeping the mixture under stirring for 5 min after the addition of each portion. After completely adding the microparticles, the mixture was kept under stirring for 30 min, in order to obtain a homogeneous suspension. Finally, the suspension was brought to 1 l with buffered water to achieve a final concentration of 140 g/l.

Example 17: Comparative Experiment with Conventional Treatment (Reference) Against Targeted Release (LD) Treatment Using Microparticles of the (PIR)SG-C18-OH Type in Oranges of Valencia Variety Inoculated with *P. digitatum*

This experiment was carried out following the same procedure as for examples 9-14. The free pyrimethanil residues in water and virtual were analyzed according to examples 18 and 19. For the reference conventional treatment (PIRREF) a solution of pyrimethanil at 525 mg/l in tap water was prepared from a commercial solution at 40% (PENBOTEC). For the LD treatment (PIR LD C18) a suspension of (PIR)SG-C18-OH of 14 g/l in tap water buffered with sodium etidronate 10 mM at pH=7.5 was prepared from the concentrated suspension described in example 16. A 14 g/l suspension correspond to a virtual pyrimethanil concentration contained within the microparticles of 525 mg/l. As a control, a treatment of bathing in tap water was carried out (CONTROL).

As shown in FIG. 16 the treatment with (PIR)SG-C18-OH provides a reduction in the percentage of rotting very similar to that of the reference treatment with pyrimethanil, with a RRI value close to 90% in both cases. These results demonstrate that the treatment with (PIR)SG-C18-OH has an efficiency comparable to that of the reference treatment with pyrimethanil in controlling the rotting of oranges of the Valencia variety inoculated with *P. digitatum*.

Also, the results in table 7 demonstrate that, in addition to having a high efficacy, the LD treatment with (PIR)SG-C18-OH presents pyrimethanil concentrations in treatment waters and residues in fruit considerably lower to those observed for the reference treatment with pyrimethanil. The values of reduction of pyrimethanil (PIR) residues provided by the LD treatment were 91% in fruit and >99.9% in water, reaching very low levels in water (with a reduction of up to 3 fold) and also very low levels in fruit (with a 1 fold reduction).

TABLE 7

Reduction of PIR residues and of [PIR] in treatment water for example 17. Oranges of Valencia variety inoculated with *P. digitatum* and stored 7 days at 22° C. and 85% RH.

|  | Dose (mg/l) | PIR residue in fruit (mg/Kg) | Reduction of residues in fruit (%) | [PIR] free in water (mg/l) | Reduction of [PIR] in water (%) |
|---|---|---|---|---|---|
| PIR REF | 525 | 1.45 | 0.0 | 525 | 0.0 |
| PIR LD C18 | 520 (*) | 0.13 | 91.0 | 0.12 | 99.98 |

(*) Virtual concentration of pyrimethanil contained in the microparticles, analyzed after the forced release according to example 19.

Therefore, the treatment with (PIR)SG-C18-OH is an alternative and advantageous solution to the treatment with reference pyrimethanil since it has a very similar efficiency in preventing rotting, but presents a considerable decrease in the intake of pyrimethanil residues by the consumer and the possible environmental pollution by the much higher concentration in treatment and washing water of the current reference treatment.

Example 18: Analysis of Free Pyrimethanil in Water by HPLC 1 ml of test solution of loaded microparticles was filtered through a nylon 0.45 micron syringe filter and later analyzed by HPLC (Agilent 1100 Series).
Chromatographic Conditions:
 Eluent: 40% Acetonitrile
 60% Phosphate buffer pH=2.5, 2 mM
 Column: ZORBAX SB-C18, 5 μm, 4.6×250 mm, T=25° C.
 Detection: DAD (205 nm)
 Retention time: 7.4 min

Example 19: Analysis of Virtual Pyrimethanil Contained within the Microparticles by Dilution and Forced Release 0.4 ml of the test solution of loaded microparticles were diluted in 20 ml of distilled water at pH=2 (0.01 M in HCl) and the mixture was stirred for 30 minutes. The pH was kept to 2 by adding dropwise, if necessary, HCl 1M. Afterwards, the sample was filtered through a nylon 0.45 micron syringe filter and next analyzed by HPLC, using the same chromatographic conditions as for the example 18.

Example 20: Loading of the Microparticles SG-C18-OH with Thiabenzadol (TBZ). Obtaining of (TBZ)SG-C18-OH 12 g of thiabenzadol were dissolved in 2 l of softened water at pH=2 (0.01 M in HCl) under vigorous stirring. The mixture was kept at pH=2 by dropwise adding HCl, if necessary, until obtaining the total dissolution of the fungicide. Next, 148 g of SG-C18-OH were added in 4 37 g portions, each portion was added slowly and once added mixing was kept for a minimum of 5 minutes of stirring before adding the next portion. Once all SG-C18-OH was added, the resulting mixture was kept under stirring for 30 additional minutes, in order to obtain a homogeneous suspension. After this time, aq. 50% NaOH was added dropwise under stirring until reaching pH=10. Stirring was kept for 10 minutes at pH=10. After this time, the suspension was vacuum filtered and the solid obtained was first vacuum dried and later in the stove at 110° C., until constant weight, obtaining the product (TBZ)SG-C18-OH as a fine white solid (160 g, 100% yield). Load: 7.5% thiabenzadol (analysis: HPLC after forced release, example 24).

The loading scheme for SG-C18-OH with thiabenzadol is represented in FIG. 17.

Example 21: Formulation of the Microparticles (TBZ)SG-C18-OH as a Concentrated Buffered Suspension 160 g of the microparticles (TBZ)SG-C18-OH were added to 0.9 l of softened water buffered with sodium phosphate 10 mM (or sodium etidronate) at pH=7.5 (pKa thiabenzadol=4.73). The addition was carried out slowly in 4 portions of 40 g, keeping the mixture under stirring for 5 min after the addition of each portion. After completely adding the microparticles, the mixture was kept under stirring for 30 min, in order to obtain a homogeneous suspension. Finally, the suspension was brought to 1 l with buffered water to achieve a final concentration of 160 g/l.

Example 22: Comparative Experiment with Conventional Treatment (Reference) Against Targeted Release (LD) Treatment Using Microparticles of the (TBZ)SG-C18-OH Type in Oranges of Valencia Variety Inoculated with *P. digitatum*

This experiment was carried out following the same procedure as for examples 9-14. The free thiabenzadol residues in water and virtual were analyzed according to examples 23 and 24. For the reference conventional treatment (TBZ REF) a solution of thiabenzadol at 1200 mg/l in tap water was prepared from a commercial solution at 40% (TEXTAR). For the LD treatment (TBZ LD C18) a suspension of (TBZ)SG-C18-OH of 16 g/l in tap water buffered with sodium etidronate 10 mM at pH=7.5 was prepared from the concentrated suspension described in example 21. A 16 g/l suspension correspond to a virtual thiabenzadol concentration contained within the microparticles of 1200 mg/l. As a control, a treatment of bathing in tap water was carried out (CONTROL).

As shown in FIG. 18 the treatment with (TBZ)SG-C18-OH provides a reduction in the percentage of rotting identical to that of the reference treatment with thiabenzadol, with a RRI value of 100% in both cases. These results demonstrate that the treatment with (TBZ)SG-C18-OH has an efficiency totally identical to that of the reference treatment with thiabenzadol in controlling the rotting of oranges of the Valencia variety inoculated with *P. digitatum*.

Also, the results in table 8 demonstrate that, in addition to having a high efficacy, the LD treatment with (TBZ)SG-C18-OH presents thiabenzadol concentrations in treatment waters and residues in fruit considerably lower to those observed for the reference treatment with thiabenzadol. The values of reduction of thiabenzadol (TBZ) residues provided by the LD treatment were 85% in fruit and >99.99% in water, reaching very low levels in water (with an up to 4 fold reduction) and trace levels in fruit.

TABLE 8

Reduction of TBZ residues and of [TBZ] in treatment water for example 22. Oranges of Valencia variety inoculated with *P. digitatum* and stored 7 days at 22° C. and 85% RH.

| | Dose (mg/l) | TBZ residue in fruit (mg/Kg) | Reduction of residues in fruit (%) | [TBZ] free in water (mg/l) | Reduction of [TBZ] in water (%) |
|---|---|---|---|---|---|
| TBZ REF | 1200 | 0.13 | 0.0 | 1200 | 0.0 |
| TBZ LD C18 | 1225 (*) | 0.02 | 84.6 | <0.04 | >99.996 |

(*) Virtual concentration of thiabenzadol contained in the microparticles, analyzed after the forced release according to example 24.

Therefore, the treatment with (TBZ)SG-C18-OH is an alternative and advantageous solution to the treatment with reference thiabenzadol since it has an identical efficiency in preventing rotting, but presents a considerable decrease in the intake of thiabenzadol residues by the consumer and the possible environmental pollution by the much higher concentration in treatment and washing water of the current reference treatment.

Example 23: Analysis of Free Thiabenzadol in Water by HPLC 1 ml of test solution of loaded microparticles was filtered through a nylon 0.45 micron syringe filter and later analyzed by HPLC (Agilent 1100 Series).
Chromatographic Conditions:
 Eluent: 20% Acetonitrile
  80% Phosphate buffer pH=2.5, 2 mM
 Column: ZORBAX SB-C18, 5 µm, 4.6×250 mm, T=25° C.
 Detection: DAD (205 nm)
 Retention time: 2.7 min

Example 24: Analysis of Virtual Thiabenzadol Contained within the Microparticles by Dilution and Forced Release 0.4 ml of the test suspension of loaded microparticles were diluted in 20 ml of acetonitrile and the mixture was stirred for 15 minutes. Next, the sample was filtered through a nylon 0.45 micron syringe filter and next analyzed by HPLC, using the same chromatographic conditions as for the example 23.

The invention claimed is:

1. A porous silica particle partially functionalized with long hydrocarbon chains with 8 to 20 carbon atoms, characterized in that it is loaded with a fungicidal agent retained by non-covalent interactions with the long hydrocarbon chains.

2. The particle according to claim 1, wherein the particle size falls within the range of 0.02-500 μm.

3. The particle according to claim 1, wherein the silica is microporous, mesoporous or microporous.

4. The particle according to claim 1, comprising a functionalization pattern according to the following surface structures:

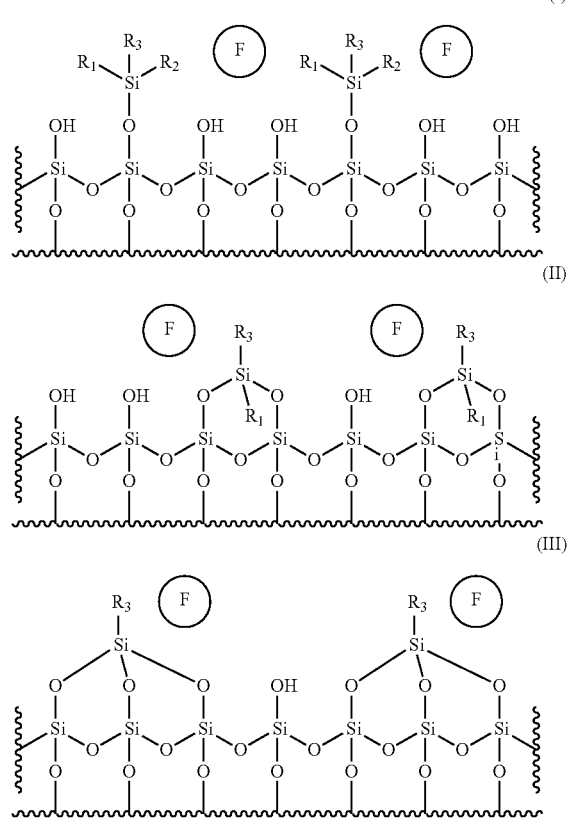

wherein $R_1$ and $R_2$ are linear or branched, saturated or unsaturated hydrocarbon chains of 1 to 5 carbon atoms, which may comprise between 0 and 3 heteroatoms selected from the group consisting of S, O and N;

$R_3$ is a linear or branched, saturated or unsaturated hydrocarbon chain with 8 to 20 carbon atoms, which may comprise between 0 and 10 heteroatoms selected from the group consisting of S, O and N; and F represents the retained fungicidal agent.

5. The particle according to claim 1, wherein the surface concentration of free silanols is between 2 and 8 μmol/m².

6. The particle according to claim 1, wherein the carbon content (w/w), provided exclusively by introducing the long-hydrocarbon chains with 8 to 20 carbon atoms, is between 5% and 20%.

7. The particle according to any of claim 1, wherein the free silanol moieties may be completely or partially functionalized with polar moieties.

8. The particle according to claim 4, wherein $R_1$, $R_2$, or $R_3$ are functionalized on the end opposite to that anchored to the silica or on one of its branches with polar moieties.

9. The particle according to claim 1, wherein the origin of the porous silica is synthetic or natural.

10. The particle according to claim 1, wherein the fungicidal agent is selected from the group consisting of o-phenylphenol, benomyl, carbendazim, fuberidazole, tiabendazole, thiophanate, methyl thiophanate, chlozolinate, iprodione, procymidone, vinclozolin, irnazalil, oxyconazole, pefurazoate, prochloraz, triflumizole, triforine, pyrifenox, phenarimole, nuarimole, azaconazole, bitertanole, bromuconazole, cyproconazole, difenoconazole, diniconazole, epoxiconazole, fenbuconazole, fluquinconazole, flusilazole, flutriafole, hexaconazole, imibenconazole, ipconazole, metconazole, myclobutanil, penconazole, propiconazole, protioconazole, simeconazole, tebuconazole, tetraconazole, triadimefon, triadirnenol, triticonazole, benalaxyl, furalaxyl, metalaxyl, mefenoxam, oxadixyl, ofurace, aldimorf, dodemorf, fenpropimorf, tridernorf, fenpropidine, piperaline, spiroxamine, edifenphos, iprobenphos, pirazophos, isoprothiolane, benodanyl, boscalid, carboxin, fenfuram, flutolanil, furametpir, mepronil, oxycarboxine, pentiopirad, thifluzamide, bupirimate, dimethirimol, ethirimol, cyprodinil, mepanipirim, pyrimethanil, diethofencarb, azoxystrobin, enestrobin, picoxystrobin, pyraclostrobln, kresoxim-methyl, trifloxystrobin, dimoxystrobin, metominostrobin, orysastrobin, famoxadone, fluoxastrobin, fenamidone, fenpiclonyl, fludioxonil, quinoxyfen, biphenyl, chloroneb, dichloran, quintozene, tecnazene, tolclophos-methyl, etridiazole, phthalide, pyroquilon, tricyclazole, carpropamide, diclocymet, fenoxanyl, fenhexarnid, pyributicarb, naphtiphine, terbinaphine, polyoxyne, pencycurone, cyazofamid, zoxamide, blasticidin S, kasugarnycin, streptomycin, validamycin, cymoxanil, iodocarb, propamocarb, prothiocarb, binapacryl, dinocap, ferimzone, fluazinarn, fentin acetate, fentin chloride, fentin hydroxide, oxolinic acid, hymexazol, octilinone, fosetyl-AI, phosphorous acid and its salts, teclophtalam, triazoxide, flusulpharnide, diclomezine, silthiofam, diflumetorirn, dimetomorf, flumorf, bentiavalicarb, iprovalicarb, mandipropamid, oxytetracycline, methasulfocarb, acibenzolar-Smethil, probenazole, tiadinil, etaboxam, ciflufenamid, proquinazid, metrafenone, fluopicolide, ferbarn, mancozeb, maneb, rnetiram, propineb, tirarn, zineb, ziram, captan, captafol, folpet, chlorothalonil, dichlofluanid, tolylfluanid, dodine, guazatine, iminoctadine, anilazine, ditianon, ampropylphos, benzamacryl, betoxazine, buthiobate, chlorosulphamic acid, cycloprate, cyprofuram, diclone, dichlobutrazole, dinoterbon, diphenylamine, dipyrithlone, ditalimphos, drazoxolon, etaconazole, phenaminosulf, flumetover, fluoroimide, cis-furconazole, furrneciclox, furofanate, gemtamycin, gliodin, halacrinate, hexachlorophene, korax, dimethyldithiocarbamate, 2-methyl-4-chlorophenoxyacetic acid, mercaptobenzothiazole, metalaxil-M, metfuroxam, metsulfovax, milneb, miclozoline, nitrotal-isopropyl, oxycarboxin, oxythioquinox, phosdiphen, phthalamic acid, polycarbamate, polyoxorim, pyracarbolid, pyridinitryl, pyroxifur, quinacetole, quinconazole, sec-butylamine, sodium dehydroacetate, (2-benzothiazolylthio)methyl thiocyanate, tetraiodoethylene, ticiofen, triclamide, zarilarnide, valifenalate, sedaxane, pyriophenone, penflufen, oxatiapiproline, metam, meptyldinocap, mandestrobin, lyserfenvalpir, isopyrazam, osofetamide, fluxapyroxad, flutianil, fluopyram, fenpyrazamine, dazomet, bixafen, benzovindiflupir, benalaxyl- M, amisulbrom, ametoctradin, 8-hydroxiquinoline, methyl 2,5-dichorobenzoate, chloropycrin, sorbic acid and its salts, benzoic acid and its salts, propionic acid and its salts, and combinations thereof.

11. The particle according to claim 1, wherein the loaded fungicidal agent makes up between 2% and 20% (w/w) with respect to the total weight of the particle.

12. A method for preparing the porous silica particles according to claim 1 that comprises the steps of:
   a. functionalizing the silica particles with long hydrocarbon chains with 8 to 20 carbon atoms
   b. loading the particles functionalized in step a) with the fungicidal agent, which comprises carrying out any one of the following steps:
      b1) suspend the particles functionalized in step a) in a concentrated aqueous solution of the fungicidal agent in its ionic form and modify the pH of the solution until bringing the fungicidal agent to its non-ionic form, said agent becoming retained by non-covalent interactions inside the particles; or
      b2) suspend the particles functionalized in step a) in a solution of the fungicidal agent in its non-ionic form with water-miscible organic solvent and subsequently add water to lower the solubility of the fungicidal agent in the organic solvent and force loading of the silica particle, as the interaction of the fungicidal agent with the long hydrocarbon chains of silica particles is more favorable than its presence in the solution; or
      b3) suspend the particles functionalized in step a) in a solution of the fungicidal agent in its non-ionic form with an organic solvent having a low boiling point which subsequently evaporates at low pressure, the fungicidal agent becoming retained inside the silica particles.

13. The method according to claim 12, wherein the functionalization of the silica particles comprises one of the following steps:
   a. Reacting the silanol moieties of the surface of the silica with reagents of the type alkyltrihalosilane, alkylmethildihalosilane, alkyldimethilhalosilane, alkyltrialkoxysilane, alkylmethildialkoxysilane or alkyldimethilalcoxysilane; or
   b. Co-condensing a precursor of the silica with a reagent type alkyltrialkoxysilane, alkylmethildialkoxysilane or alkyldimethilalcoxysilane in the presence of a poreformation precursor substance,
   wherein the alkyl moieties of the reagents mentioned in steps a) and b) are a linear or branched, saturated or unsaturated hydrocarbon chain with 8 to 20 carbon atoms, which may comprise between 0 and 10 heteroatoms selected from the group consisting of S, O and N, it being possible to substitute the methyls with short saturated or unsaturated, linear or branched chains with 1 to 5 carbon atoms and which may comprise between 0 and 3 heteroatoms selected from the group consisting of S, O and N and the alkoxy moieties are formed by short linear or branched, saturated or unsaturated chains of 1 to 6 carbon atoms, and may comprise between 0 and 3 heteroatoms selected from the group consisting of S, O and N.

14. The method according to claim 12, wherein modifying the pH in step b1) comprises:
   a. Reducing the pH by means of acids from the group of the inorganic acids, or from that of the water-miscible organic acids, in both cases monoprotic or polyprotic, strong or weak; or
   b. Increasing the pH by means of mono- or polyvalent compounds from the group of the hydroxides, from the group of the inorganic base salts, from the group of the water-miscible nitrogenated heterocycles or from the group of the water-miscible organic amines, including ammonia.

15. The method according to claim 12, wherein the water-miscible solvent of step b2) is selected from the group consisting of acetone, acetonitrile, alcohols, dimethylsulfoxide, dimethylformamide, dioxane, tetrahydrofurane, and combinations thereof.

16. The method according to claim 12, wherein the organic solvent having a low boiling point of step b3) is selected from the group consisting of: haloalkanes; alkyl ethers; short chain alkanes; alkyl alkanoates; alcohols; acetone; acetonitrile; and combinations thereof.

17. A system for the controlled and targeted release of fungicides over infected areas of plant tissue which comprises particles according to claim 1 suspended in a buffer solution at a pH in which the fungicidal agent stays in its non-ionic form.

18. The system according to claim 17 wherein the concentration of the particles in the suspension falls between 1 g/l and 300 g/l.

19. The system according to claim 17, wherein the fungicidal agent is selected from the group consisting of imazalyl, tiabendazole, pyrimethanil, cyprodinil, mepanipirim, prochloraz, propiconazole, fludioxonil, and combinations thereof, and wherein the buffer solution is at a pH equal to or great than 7.5.

20. The particle according to claim 1, wherein the surface concentration of free silanols is between 4 and 7.5 mol/m$^2$.

21. The particle according to claim 1, wherein the carbon content (w/w), provided exclusively by introducing the long-hydrocarbon chains with 8 to 20 carbon atoms, is between 10% and 15%.

22. The particle according to claim 7, wherein the free silanol moieties are completely or partially functionalized with polar moieties selected from the group consisting of polysaccharides, polyethylene glycols or hydrocarbon chains ending in amino, carboxylate, sulfonate, and phosphonate or quaternary ammonium salt moieties.

23. The particle according to claim 8, wherein $R_1$, $R_2$, or $R_3$ are functionalized on the end opposite to that anchored to the silica or on one of its branches with polar moieties selected from the group consisting of polysaccharides, polyethylene glycols, or amino carboxylate, sulfonate, and phosphonate or quaternary ammonium salt moieties.

24. The method according to claim 12, wherein the water-miscible solvent of step b2) is selected from the group consisting of acetone, acetonitrile, methanol, ethanol, propanol, butanol, isopropanol, dimethylsulfoxide, dimethylformamide, dioxane, tetrahydrofrurane, and combinations thereof.

25. The method according to claim 12, wherein the organic solvent having a low boiling point of step b3) is selected from the group consisting of chloroform, dichloromethane, ethyl ether, tetrahydrofuran, pentane, hexane, heptane, ethyl acetate, methanol, ethanol, acetone, acetonitrile, and combinations thereof.

* * * * *